United States Patent
Dent et al.

(10) Patent No.: US 8,606,850 B2
(45) Date of Patent: Dec. 10, 2013

(54) METHOD, APPARATUS AND SYSTEM FOR CONTROLLING TRANSMISSION OF AN ATTACHMENT TO AN EMAIL USING A PLURALITY OF COMPUTERS

(75) Inventors: Terrill Mark Dent, Waterloo (CA); Michael Stephen Brown, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 261 days.

(21) Appl. No.: 13/075,322

(22) Filed: Mar. 30, 2011

(65) Prior Publication Data

US 2012/0079005 A1    Mar. 29, 2012

Related U.S. Application Data

(60) Provisional application No. 61/386,631, filed on Sep. 27, 2010.

(51) Int. Cl.
    *G06F 15/16*    (2006.01)
(52) U.S. Cl.
    USPC .......................................... 709/203; 709/201
(58) Field of Classification Search
    USPC .......... 709/201, 202, 203, 217, 218, 205, 206
    See application file for complete search history.

(56) References Cited

U.S. PATENT DOCUMENTS

| | | | |
|---|---|---|---|
| 6,157,941 A | 12/2000 | Verkler et al. | |
| 6,282,709 B1 | 8/2001 | Reha et al. | |
| 6,308,061 B1 | 10/2001 | Criss et al. | |
| 7,103,656 B2 | 9/2006 | Lewis et al. | |
| 7,251,727 B2 | 7/2007 | Adams et al. | |
| 7,546,595 B1 | 6/2009 | Wickham et al. | |
| 7,555,749 B2 | 6/2009 | Wickham et al. | |
| 2002/0161796 A1 | 10/2002 | Slythe | |
| 2002/0163895 A1 | 11/2002 | Haller et al. | |

(Continued)

FOREIGN PATENT DOCUMENTS

| | | |
|---|---|---|
| CA | 2583184 C | 6/2012 |
| EP | 1630690 A1 | 3/2006 |

(Continued)

OTHER PUBLICATIONS

Things to Know Before Installing Windows Updates/SpywarePreventionGuy; Jun. 1, 2010 Downloaded from: http://spywarepreventionguy.com/windows-updates/.

(Continued)

*Primary Examiner* — Hassan Phillips
*Assistant Examiner* — Siren Wei
(74) *Attorney, Agent, or Firm* — Perry + Currier

(57) ABSTRACT

A method, apparatus and system for controlling transmission of an attachment to an email using a plurality of computers is provided. In one aspect, a client machine and a mobile computing device are provided. The client machine is configured to execute a browser application. The mobile computing device is configured to host a web server application. When the client machine and the mobile computing device are connected, functions on the mobile computing device become available on the client machine via the interaction between the web server and the browser, specifically e-mail functionality and control of transmission of attachments. Further, updates on attachment download at the mobile computing device are sent to the client machine in response to periodic requests from the client machine.

13 Claims, 31 Drawing Sheets

(56) References Cited

U.S. PATENT DOCUMENTS

| | | | |
|---|---|---|---|
| 2004/0015948 A1* | 1/2004 | Sueyoshi et al. | 717/170 |
| 2006/0013258 A1* | 1/2006 | Banerjee et al. | 370/474 |
| 2006/0212548 A1 | 9/2006 | Faisal et al. | |
| 2008/0005247 A9* | 1/2008 | Khoo | 709/206 |
| 2008/0172663 A1* | 7/2008 | Lee | 717/173 |
| 2009/0248820 A1* | 10/2009 | Basir et al. | 709/206 |

FOREIGN PATENT DOCUMENTS

| | | |
|---|---|---|
| KR | 20040059530 A | 7/2004 |
| WO | 2006066411 A1 | 6/2006 |
| WO | 2010/123757 A1 | 10/2010 |

OTHER PUBLICATIONS

Nimbus Land.blogspot; Nov. 16, 2008 Downloaded from: http://mnimbusland.blogspot.ca/2008_11_16_archive.html.

Related European Patent Application No. 11176655.6 Examination Report dated Oct. 18, 2012.

Wikipedia: "Nokia N95", Internet Article, Sep. 22, 2010, XP55040856, Retrieved from the Internet:URL:http://en.wikipedia.org/w/index.php?title=Nokia_N95&oldid=386408046 [retrieved on Oct. 12, 2012].

Wikipedia: "Mobile Web Server (SymbianOS)", Internet Article, Sep. 11, 2010, pp. 1-3 XP55015014, Retrieved from the Internet: URL:http://en.wikipedia.org/w/index.php?title=Mobile Web Server %28Symbian OS%29&old id=384209208.

PCT/CA2011/001068 International Search Report mailed date Dec. 1, 2011.

PCT/CA2011/001068 Written Opinion mailed date Dec. 1, 2011.

European Patent Application No. EP 11176655.6 Extended Search Report dated Jan. 13, 2012.

European Patent Application No. EP 11160507.7 Extended Search Report dated Dec. 20, 2011.

Android Tethering—Source http://lifehacker.com/5447347/how-to-tether-your-andorid-phone Retrieved from the internet on Dec. 14, 2010.

iPhone as WiFi Router Using PDA Net Software—Source—http://www.intomobile.com/2008/10/21/iphone-wifi-router-pda-net-makes-iphone-3g-tethering-easier-than-ever/ Retrieved from the internet on Dec. 14, 2010.

* cited by examiner

METHOD, APPARATUS AND SYSTEM FOR CONTROLLING TRANSMISSION OF AN ATTACHMENT TO AN EMAIL USING A PLURALITY OF COMPUTERS

CROSS-REFERENCE TO RELATED APPLICATION

This application claims priority from U.S. Provisional Application No. 61/386,631 filed Sep. 27, 2010, the contents of which are incorporated herein by reference.

FIELD

The present specification relates generally to computing devices and more particular relates to a method, apparatus and system for controlling transmission of an attachment to an email using a plurality of computers.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTION OF THE DRAWINGS

For a better understanding of the various embodiments described herein and to show more clearly how they may be carried into effect, reference will now be made, by way of example only, to the accompanying drawings in which:

FIG. 25 shows an example Graphic User Interface for implementing certain blocks of the method of FIG. 20.

Figure 27:
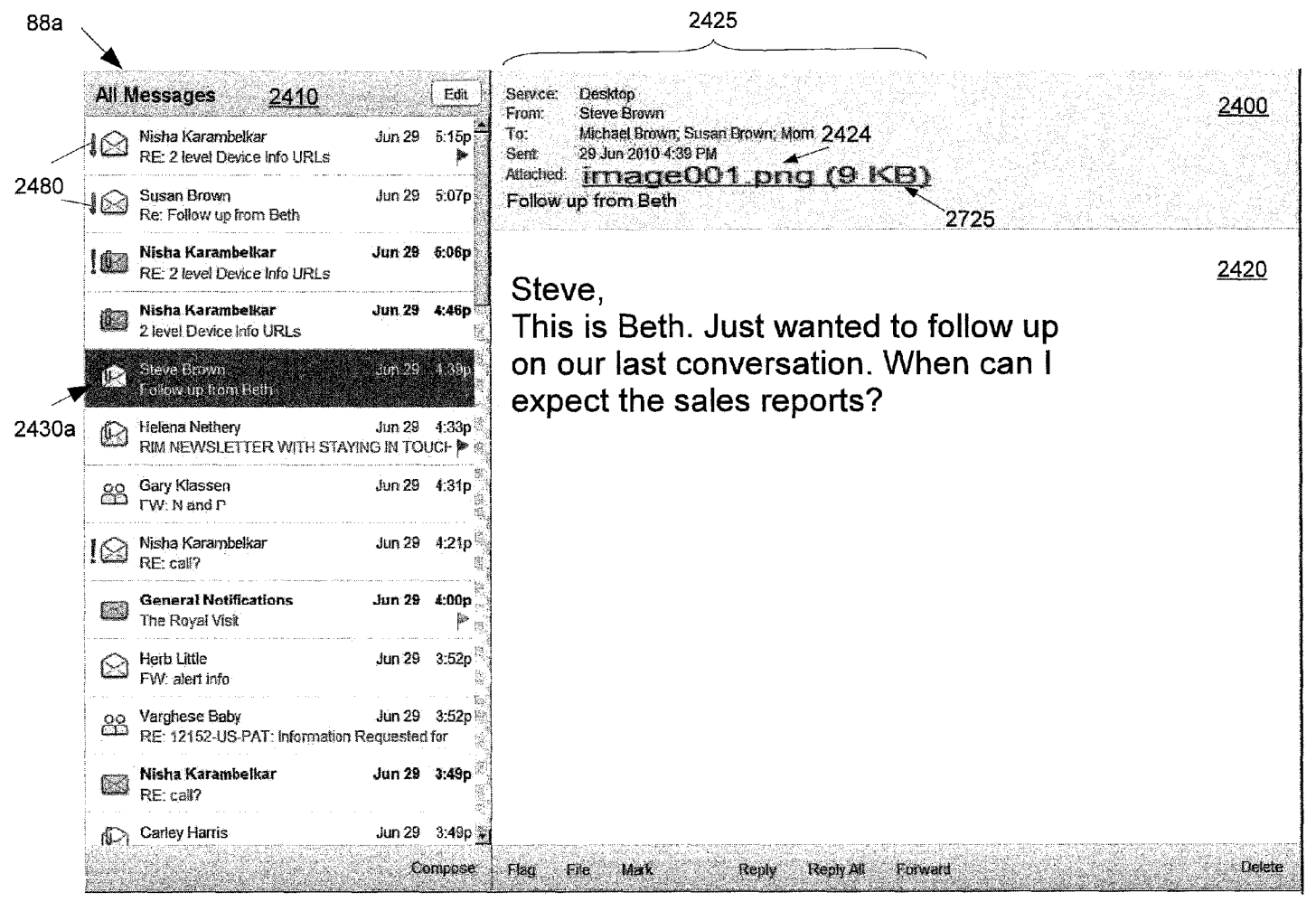

FIG. 27 shows an example Graphic User Interface for implementing certain blocks of the method of FIG. 20.

DETAILED DESCRIPTION

Figure 1:
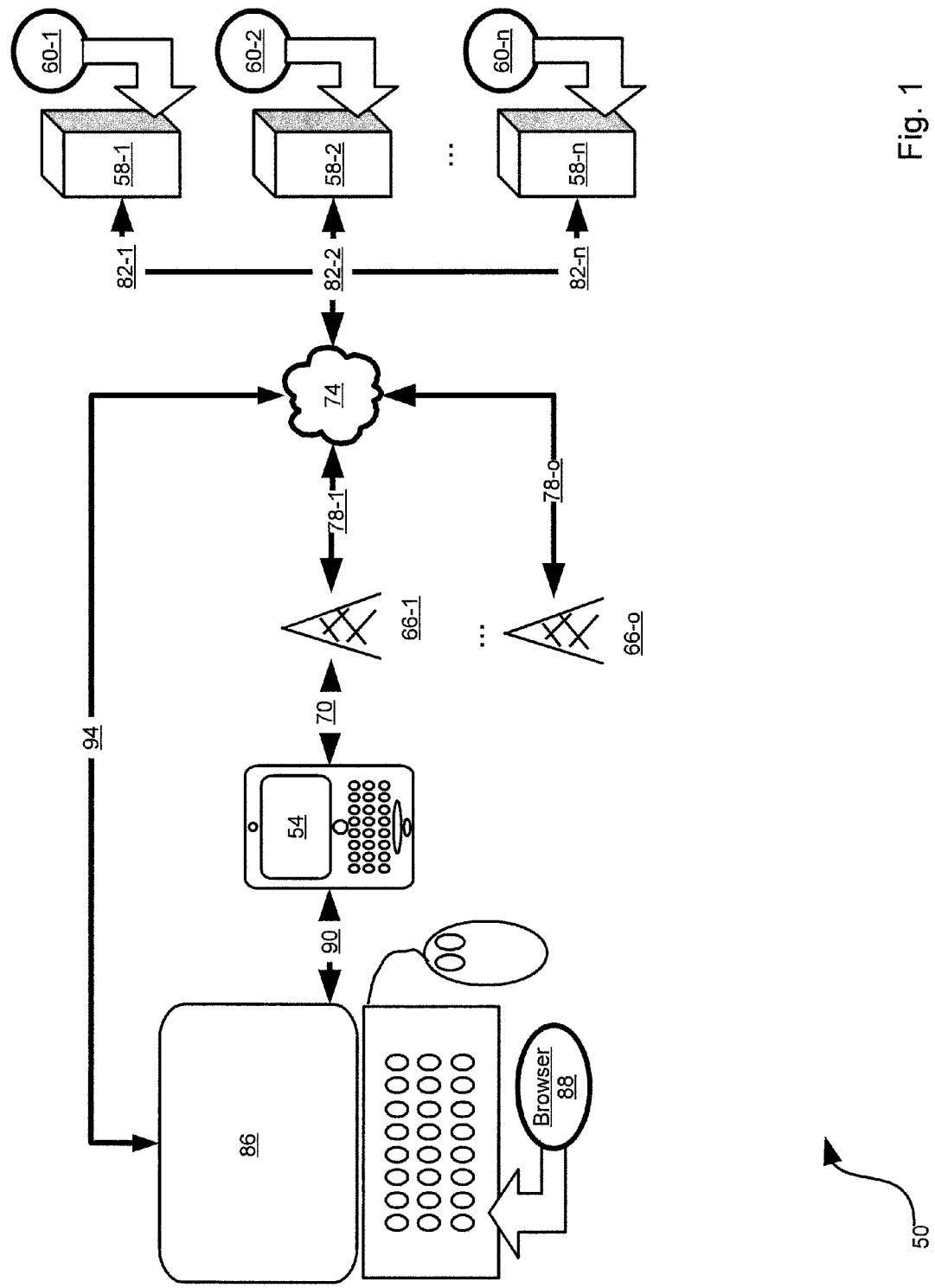
FIG. 1 is a schematic representation of a system for accessing an application across a plurality of computers.

Referring now to FIG. 1, a system for accessing an application across a plurality of computers is indicated generally at 50. In a present embodiment system 50 comprises at least one computing device in the form of a mobile computing device 54 and at least one server 58-1, 58-2 . . . 58-n. (Generically, server 58, and collectively, servers 58. This nomenclature is used elsewhere herein).

A wireless link 70 connects mobile computing device 54 with one of a plurality of wireless base stations 66. In FIG. 1, mobile computing device 54 is shown as connecting to a first base station 66-1 via wireless link 70, but mobile computing device 54 can also connect to other base stations 66 in system 50. Backhaul links 78 connect each base station 66 to a network 74. Additional backhaul links 82 connect network 74 to each server 58.

Mobile computing device 54 can be any type of electronic device that can be used in a self-contained manner and to interact with content available on network 74. Interaction includes displaying of information on mobile computing device 54 as well as to receive input at mobile computing device 54 that can in turn be sent back over network 74. Mobile computing device 54 will be explained in greater detail below.

It should now be understood that the nature of network 74 and links 70, 78 and 82 associated therewith is not particularly limited and are, in general, based on any combination of architectures that will support interactions between mobile computing device 54 and servers 58. In a present embodiment network 74 includes the Internet as well as appropriate gateways and backhauls to links 78 and 82. For example, backhaul links 78 and backhaul links 82 can be based on a T1, T3, O3 or any other suitable wired or wireless connections. Accordingly, the links 78 and 82 between network 74 and the interconnected components are complementary to functional requirements of those components.

Link 70 may be based on, by way of non-limiting examples, a core mobile network infrastructure, such as, by way of non-limiting examples, one or more of Global System for Mobile communications ("GSM"); Code Division Multiple Access ("CDMA"); CDMA 2000;) 3G; or Evolution-Data Optimized or Evolution-Data ("EVDO"); or successors thereto or hybrids or combinations thereof; or on wireless local area network ("WLAN") infrastructures such as, by way of non-limiting examples, the Institute for Electrical and Electronic Engineers ("IEEE") 802.11 Standard (and its variants) or Bluetooth or the like or hybrids or combinations thereof. Note that in an example variation of system 50 it is contemplated that link 70 may be a wired connection.

A client machine 86 also connects to mobile computing device 54 via a link 90. In a present example implementation, client machine 86 is a desktop, notebook, or laptop computer and link 90 is a direct connection effected wirelessly or wired. Where link 90 is wireless, then link 90 can be, for example, a Bluetooth™ or a peer-to-peer Wi-Fi connection between client machine 86 and mobile computing device 54. Where link 90 is wired, then link 90 can be, for example, a universal serial bus (USB) or Firewire connection. Those skilled in the art will now recognize other types of wired or wireless connections that can be used to effect a direct connection for link 90. In variations, link 90 can be effected indirectly through, for example, a local area network or a Wi-Fi network, or even through a wide area network such as network 74.

Client machine 86 is initially configured to maintain or execute at least a web browser application 88, and need not have direct access to network 74, though in some cases such a direct connection to network 74 would be possible through a link 94. Accordingly, client machine 86 can be based on any computing environment that provides web browsing functionality. For example, such a computing environment can be based on an Intel™ or AMD™ or other microprocessor, with accompanying volatile storage (e.g. random access memory) and non-volatile storage (e.g. Flash, Hard disc drive), read only memory (ROM), network interface card(s), video cards that connect to one or more displays, a keyboard, a mouse (or other pointing device). Any operating system may be used, including, for example, an operating system offered by Microsoft™, or a Linux™ operating system, or an operating system offered by Apple Computer. Browser application 86 can be any browser application that is executable on a respective operating system, including Firefox™, Internet Explorer™, Chrome™, Opera™ or Safari™. Typically, though not necessarily, client machine 86 will have a display or a keyboard or both that are larger than that provided on mobile computing device 54. Client machine 86 may also have another configuration, such as a tablet computing device.

Servers 58 can be based on any well-known server environment including a module that houses one or more central processing units, volatile memory (e.g. random access memory), persistent memory (e.g. hard disk devices) and network interfaces to allow servers 58 to communicate over network 74. For example, each server 58 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for each server 58 is contemplated. Furthermore, it is contemplated that each server 58 may be implemented as a plurality of interconnected servers, in a so-called server farm, which are mirrored or otherwise configured for load balancing or failover or high availability or any or all of those.

As will be discussed further below, each server 58 maintains a different networking application 60. Networking applications 60 can be any application whereby a corresponding client-side application executes on mobile computing device 54 which accesses data or any other server functions on a given server 58. Networking applications 60 can be, by way of non-limiting examples, personal information management applications, social networking applications, or messaging applications. Non-limiting examples of personal information management applications include calendaring and contact management applications. Non-limiting examples of social networking application include Facebook™, Twitter™, LinkedIn™, and MySpace™. Networking applications 60 can also comprise message applications such email, BlackBerry Messenger, AOL instant messenger (AIM), Yahoo Messenger (YM), Google Talk (Gtalk), Lotus Connections, Windows Live Messenger. There are many others.

Figure 2:
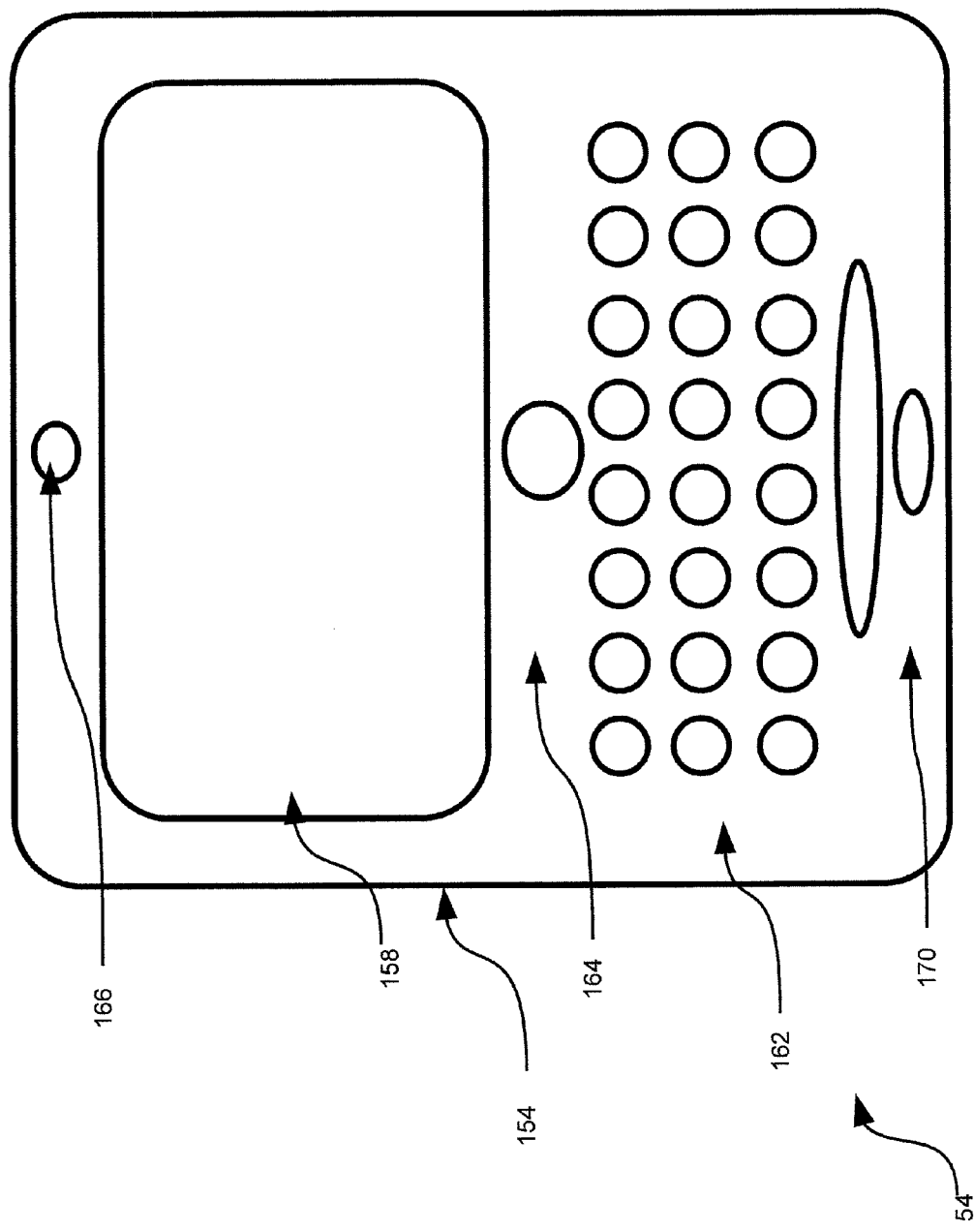
FIG. 2 is a representation of a front view of the mobile computing device of the system of FIG. 1.
Figure 3:
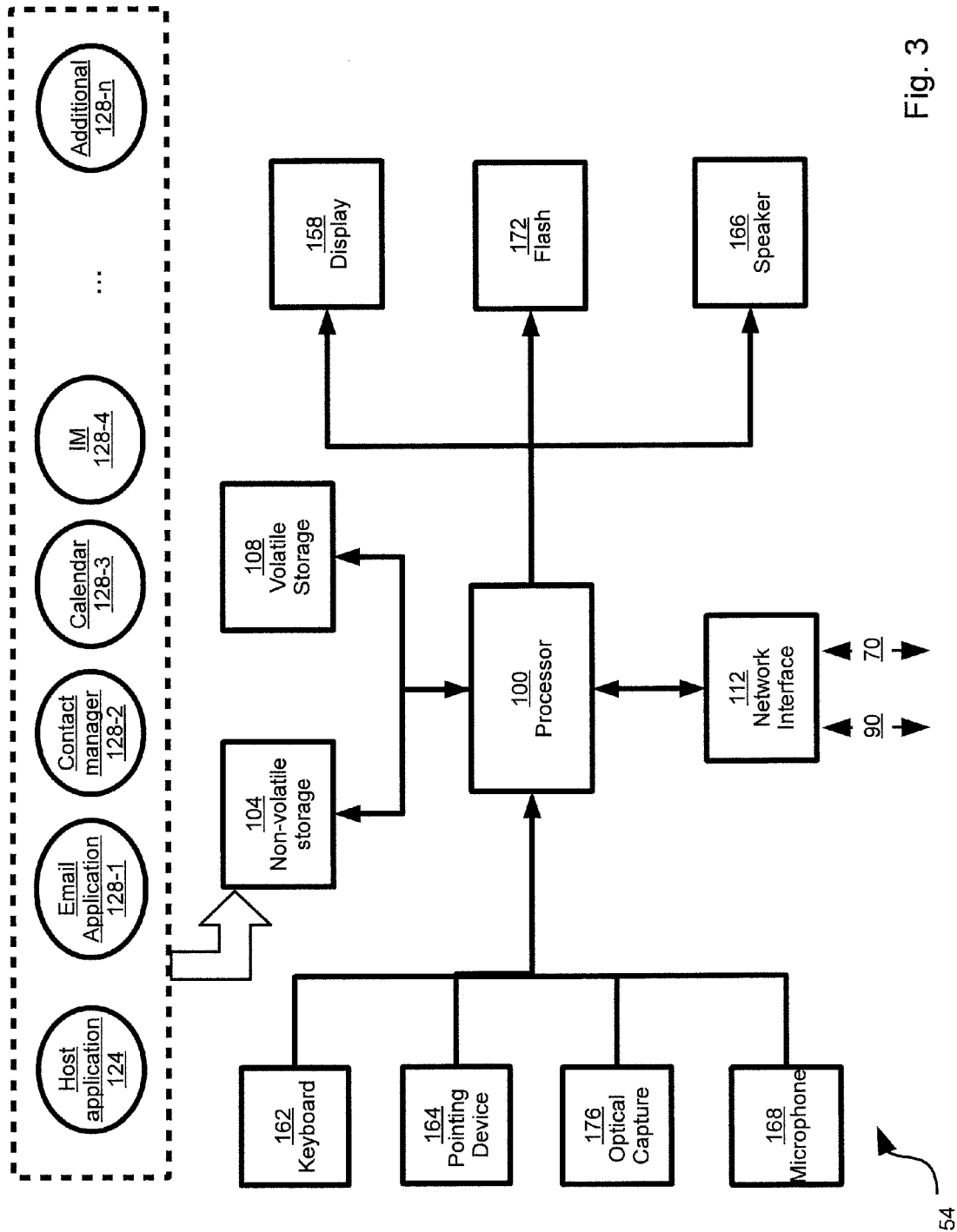
FIG. 3 is a block diagram of the device shown in FIG. 1.

FIG. 2 and FIG. 3 show different views and representations of a non-limiting example of a mobile computing device 54 which can execute one or more applications as discussed in greater detail below. It is to be understood that mobile computing device 54 is an example, and it will be apparent to those skilled in the art that a variety of different portable electronic device structures are contemplated. Indeed variations on mobile computing device 54 can include, without limitation, a cellular telephone, a portable email paging device, a network enabled digital camera, a portable music player, a portable video player, a portable video game player.

Referring to FIG. 2, in a present, non-limiting example, device 54 comprises a chassis 154 that supports a display 158. Display 158 can comprise one or more light emitters such as an array of light emitting diodes (LED), liquid crystals, plasma cells, or organic light emitting diodes (OLED). Other types of light emitters are contemplated. Chassis 154 also support a keyboard 162. It is to be understood that this specification is not limited to any particular structure, spacing, pitch or shape of keyboard 162, and the depiction in FIG. 2 is an example. For example, full or reduced "QWERTY" keyboards are contemplated. Other types of keyboards are contemplated. (In variations, device 154 may also be a touchscreen device with no physical keyboard.) Device 154 also comprises a pointing device 164 which can be implemented as a touch-pad, joystick, trackball, track-wheel, or as a touch sensitive membrane on display 158. Device 154 may also comprise a speaker 166 for generating audio output, and a microphone 168 for receiving audio input.

FIG. 3 shows a schematic block diagram of the electronic components of device 154. It should be emphasized that the structure in FIG. 3 is an example. Device 154 includes a plurality of input devices which in a present embodiment includes keyboard 162, pointing device 164, and microphone 168 and an optical capture unit 176. Fewer, additional, or alternative input devices are contemplated. Input from keyboard 162, pointing device 164 and microphone 168 and optical capture unit 176 is received at a processor 100. Processor 100 can be configured to execute different programming instructions that can be responsive to the input received via input devices. To fulfill its programming functions, processor 100 is also configured to communicate with a non-volatile storage unit 104 (e.g. Erase Electronic Programmable Read Only Memory ("EEPROM"), Flash Memory) and a volatile storage unit 108 (e.g. random access memory ("RAM")). Programming instructions that implement the functional teachings of device 154 as described herein are typically maintained, persistently, in non-volatile storage unit 104 and used by processor 100 which makes appropriate utilization of volatile storage 108 during the execution of such programming instructions.

Processor 100 in turn is also configured to control display 158, speaker 166 and flash 172, also in accordance with different programming instructions and optionally responsive to different input received from the input devices. Fewer, additional, or alternative output devices are contemplated.

Processor 100 also connects to a network interface 112, which can be implemented in a present embodiment as one or more radios configured to communicate over link 70 and link 90. Network interface 112 can thus be generalized as a further input/output device that can be utilized by processor 100 to fulfill various programming instructions. It will be understood that interface 112 is configured to correspond with the network architecture that defines each link 70 and link 90. It is also contemplated that each network interface 112 can include multiple radios to accommodate the different protocols that may be used to implement different types of links where the network architecture for each link 70 differs between base stations 66, or where link 90 may be based on different architectures. For example, link 90 may also be a wired link (e.g. USB) in which case it may not have a radio at all.

In a present embodiment, device 54 is also configured to maintain, within non-volatile storage 104, a host application 124, and one or more client applications 128 such as an email application 128-1, a contact manager application 128-2, a calendar application 128-3, an instant messenger application 128-4 or one or more of a plurality of additional applications 128-n. Non-limiting examples of additional applications 128 can comprise, without limitation, one or more of social networking client applications, e.g., Twitter, Facebook, MySpace, LinkedIn; other applications associated with online communities e.g., Flickr, Gtalk, etc; document tools such as Google Docs. Any one or more of host application 124 and client applications 128 can be pre-stored in non-volatile storage 104 upon manufacture of device 54, or downloaded via network interface 112 and saved on non-volatile storage 104 at any time subsequent to manufacture of device 54. Each application 128 is also configured to interact with its corresponding network application 60 as needed.

Processor 100 is configured to execute each application 128, making use of input from input devices and controlling display 158 to generate output based on that input and according to the programming instructions of each application 128. In general, each application 128 can be based on any existing or future application 128 that can be executed entirely on a device such as device 54, even when link 90 is not active and device 54 is disconnected from client machine 86. For example, email application 128-1 can be a standard electronic mail application that is already commonly deployed on various devices such as device 54 and entirely usable on device 54, without any connection to client machine 86, and while accessing servers 58 as needed. Likewise contact manager application 128-2, calendar application 128-3, instant messenger application 128-4 and any of the additional applications 128-n can be based on such applications that are already commonly deployed, or may be deployed in the future, and entirely usable on device 54 without any connection to client machine 86, and while accessing servers 58 as needed.

Processor 100 is also configured to execute host application 124 to permit access to client applications 128 via client machine 86, when link 90 is active, as will be explained further below.

Figure 4:
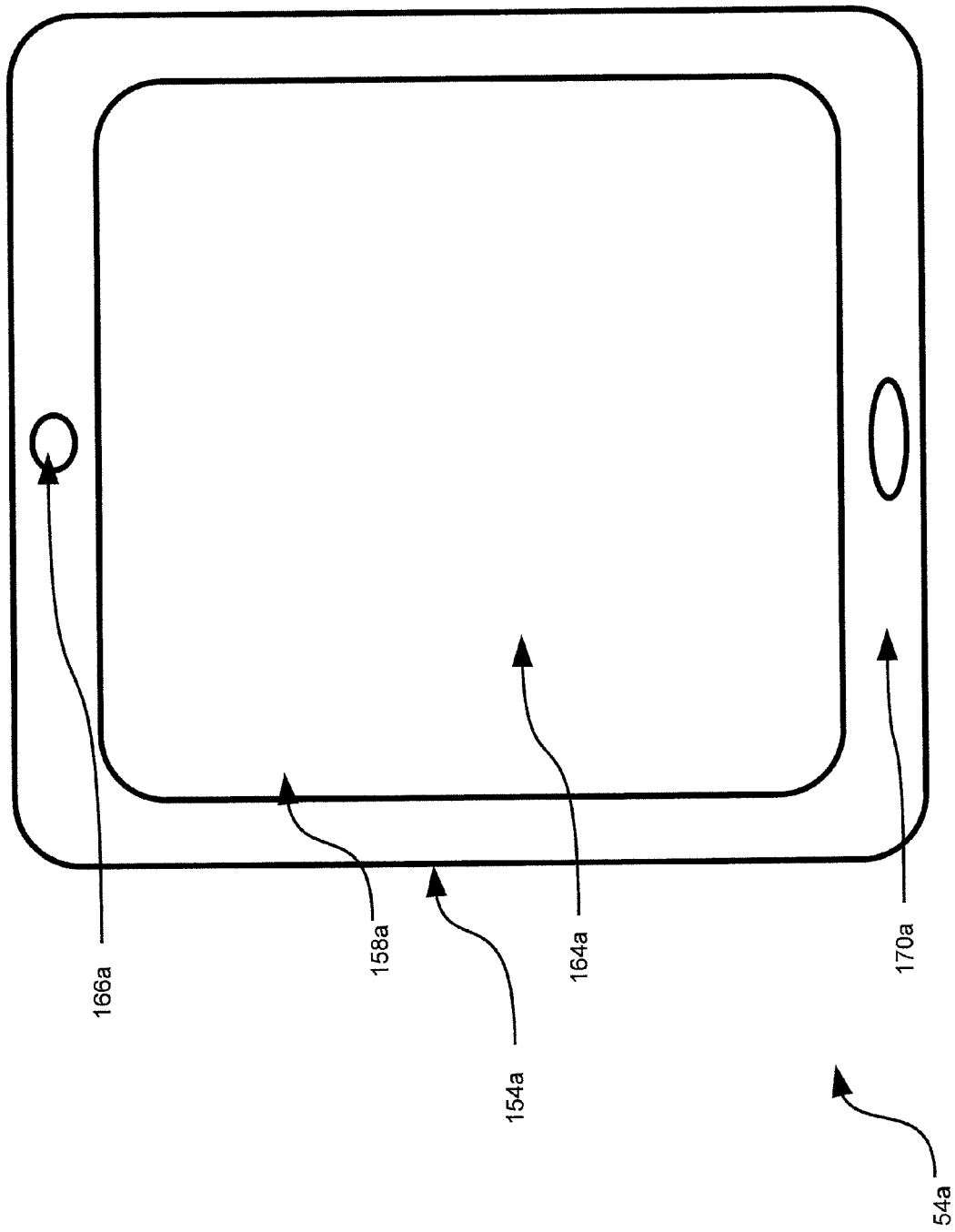
FIG. 4 is a representation of a variation of the mobile computing device of FIG. 1.

Referring briefly to FIG. 4, a variation on device 54 is indicated generally as device 54a. Device 54a comprises many of the same components as device 54, and therefore like components bear like references except followed by the suffix "a". Of note is that device 54a excludes keyboard 162 and pointing device 164. Instead, device 54a comprises a touch screen 164a which provides the combined functionality of keyboard 162 and pointing device 164. Further variations on device 54 will now occur to those skilled in the art, but for convenience, further discussion of the present specification will focus on device 54 as described above. As will become apparent from further discussion herein, the lack of a full keyboard in device 54a presents certain limitations for providing input to device 54a, and those limitations may be mitigated by the present specification.

Figure 5:
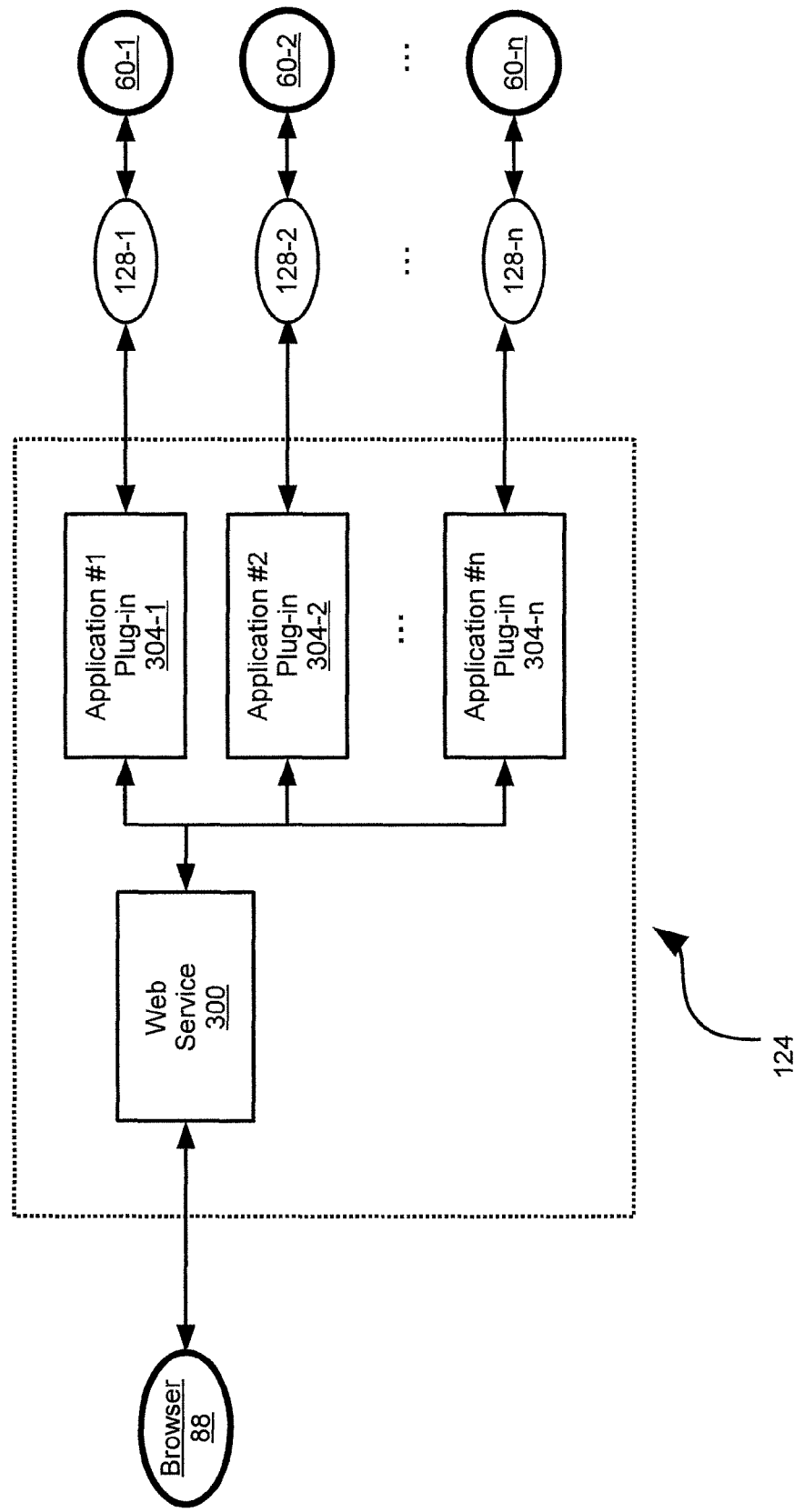
FIG. 5 is a block diagram showing a non-limiting example of the host application in FIG. 3.

FIG. 5 shows a block diagram of an example an implementation of host application 124 and its virtual connections to browser 88 and applications 128. The virtual connections between applications 128 are also shown to applications 60. Those skilled in the art will now recognize that the components and connections in FIG. 5 can be implemented using the hardware structures shown in FIG. 1, or variations thereon. Host application 124 thus comprises a web service 300 and a plurality of application plug-ins 304. Web service 300 is configured to generate and serve content to browser 88, on behalf of each application 128 via respective application plug-ins 304. Application plug-ins 304 are configured to act as programming interfaces between web service 300 and applications 128. Accordingly, each application plug-in 304 is uniquely for its corresponding application 128, so that web service 300 can generate hyper-text markup language (HTML), as desired, and any other code (e.g. JavaScript files, Cascading Style Sheets) that are usable by browser 88, so that graphical interfaces can be generated on client machine 86 for each application 128. According to this implementation, no modification to each application 128 is needed in order to provide access to those applications 128 via browser 88. Instead, access to a particular application 128 can be provided on browser 88 by creating a plug-in 304 for that particular application 128. Alternatively, a plug-in 304 may be implemented as a component of a particular application 128.

Figure 6:
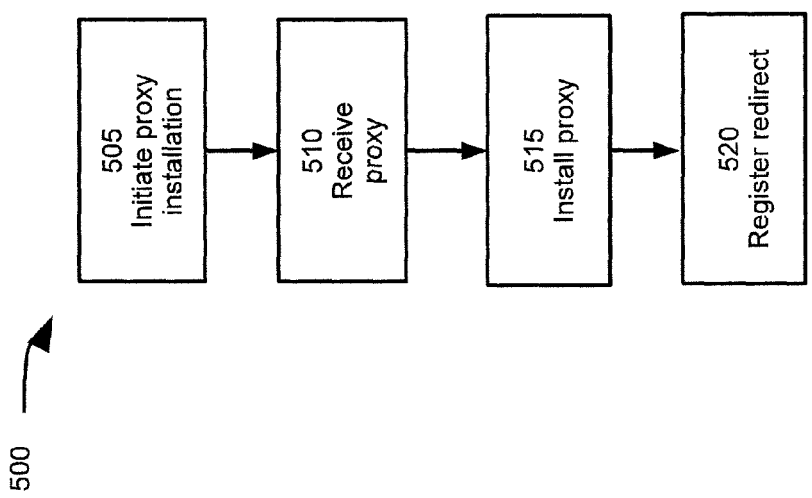
FIG. 6 is a flow-chart depicting a method of installing a proxy application.

Referring now to FIG. 6, a flow-chart depicting a method for provisioning a client machine to interact with a mobile electronic device is indicated generally at 500. Method 500 can be implemented using system 50, and for purposes of explaining method 500 it will be assumed that method 500 is performed using system 50. However, it is to be understood that variations are contemplated to both method 500 and system 50 and such variations are within the scope of this specification. Method 500 is not strictly required, but in a present implementation method 500 provides a proxy on client machine 86 such that web service 300 is addressable and reachable from the address bar in browser 88. Method 500 also assumes that link 90 is a direct link between client machine 86 and mobile electronic device 54. Again, such a direct connection for link 90 can be a peer-to-peer Bluetooth™ connection whereby client machine 86 and device 54 are "paired" using known Bluetooth™ hardware and network protocols. Such a direct connection for link 90 can also be a USB cable connection. Other means for implementing link 90 will now occur to those skilled in the art. In a present implementation, it is assumed that link 90 is a Bluetooth™ connection.

Block 505 comprises receiving an instruction to install a proxy application. Block 505 can be implemented in different ways. One factor that affects how block 505 is implemented is the location where the installation file for the proxy application is stored. In one implementation, the proxy application is stored on a server (possibly one or more of servers 58, though not necessarily) connected to network 74, in which case installation initiation may be effected by entering a uniform resource locator (URL) into browser 88 that points to the network 74 address of the server that stores the proxy application. In another implementation, the proxy application is stored as a data file within persistent storage 104 of device 54. In this implementation, non-volatile storage 104 of device 54 is configured to appear as an external hard-disk when link 90 is active—this type of configuration being inherent in many operating systems and devices such as device 54, where link 90 is a USB connection. Thus, once device 54 appears as a hard-disk, the data file containing the proxy application can be downloaded via link 90 onto client machine 86. In variations, the proxy could be provided on a CD or other removable media.

Block 510 comprises receiving the proxy application for which installation was initiated at block 505. When proxy application is stored on network 74, then block 510 comprises downloading the proxy application via network 74 and link 94. When proxy application is stored on device 54, then the proxy application is transferred via link 90 to client machine 86.

Those skilled in the art will now recognize other means of effecting block 505 and block 510.

Block 515 comprises installing the proxy application that was received at block 510. At this point it will be appreciated that the form in which proxy application is originally stored and received can vary according to the level of sophistication to be employed in the actual installation of the proxy application. It is presently contemplated that the proxy application will be an executable application that invokes an installation wizard, or the like, so that a simple series of key strokes on client machine 86 are all that is required to actually install the proxy application. However, proxy application can be received at block 510 in other forms.

Figure 7:
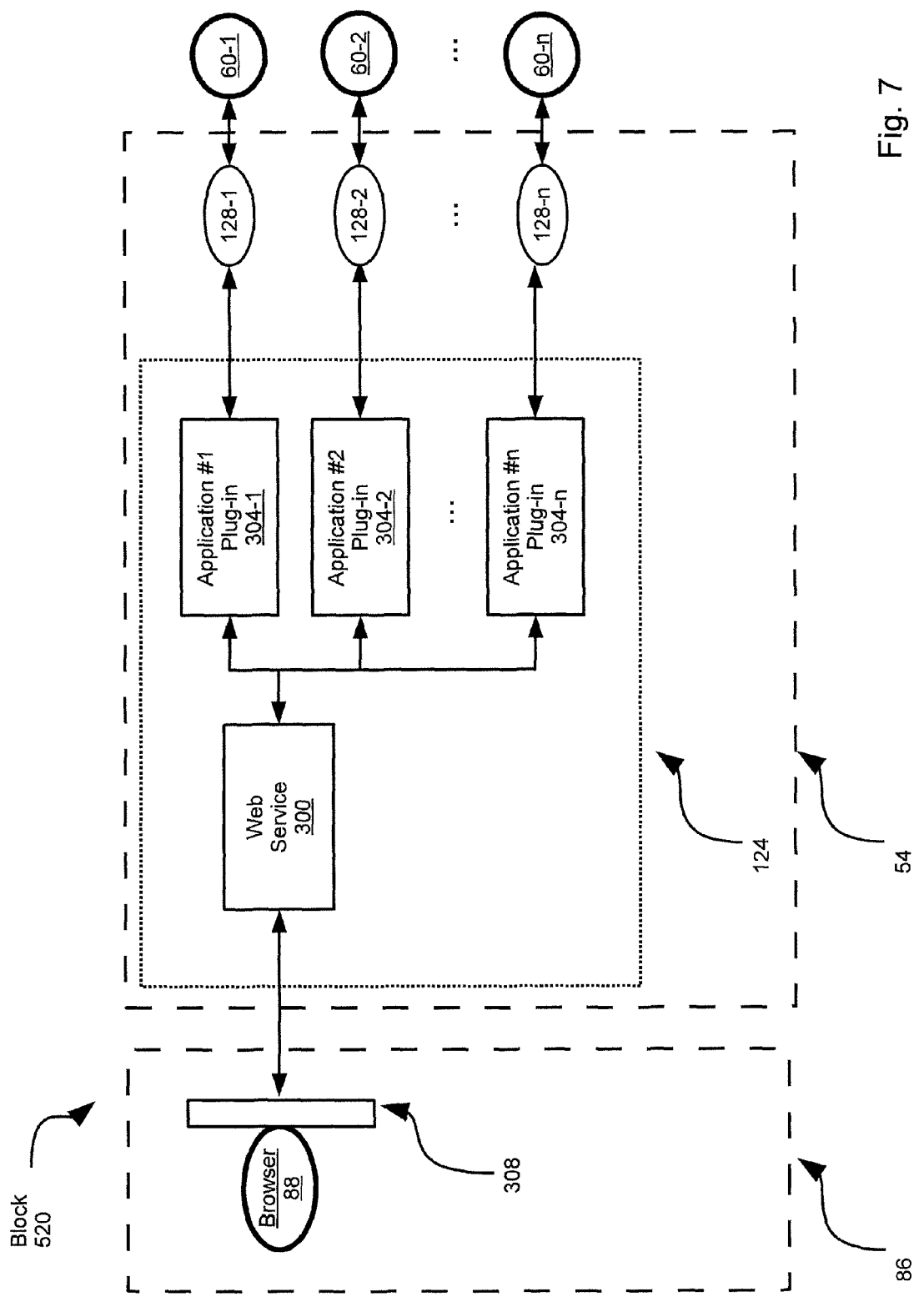
FIG. 7 shows an example of system 50 after installation of the proxy application according to the method of FIG. 6, using a variation of the block diagram in FIG. 5.

Block 520 comprises registering the proxy application installed at block 515. Such registration is local to the client machine and serves to identify a URL or Internet Protocol (IP) address redirect such that entry of that URL or IP addresses that causes browser 88 to access web service 300. A representation of portions of system 50 is shown in FIG. 7, which itself is a variation on FIG. 5. FIG. 7 is thus substantially the same as FIG. 5, except that a proxy application 308 is shown as being installed on client machine 86 and sitting between browser 88 and web service 300 on device 54. Expressed another way, proxy application 308 configures client machine 86 so that entry of a given URL or other address in the address bar of browser 88 directs browser 88 to connect with web service 300 and to generate a web page on the display of client machine 86 that corresponds to a web page being offered by web service 300. An example of such a URL may be, http://localhost, provided such a URL is not already reserved for another proxy application on client machine 86. Thus, upon entry of http://localhost, browser 88 will be directed to proxy 308 and in turn browser 88 will connect to web service 300. Returning to the example where link 90 is based on Bluetooth™, then proxy application 308 sits between browser 88 and the Bluetooth service and drivers executing on client machine 86, and forms a virtual connection with device 54 according to the Bluetooth pairing that has been registered on the Bluetooth service of device 54. In turn, web service 300 is configured to respond to HTTP requests received via the Bluetooth service that is resident on device 54.

At this point it is to be reiterated that method 500 and the use of proxy application 308 is not needed in all implementations contemplated by this specification, and accordingly, certain of the following discussions may not make reference to proxy application 308 and FIG. 7. However, it is also to be understood that the following discussion is also applicable to configurations that utilize proxy application 308.

Figure 8:
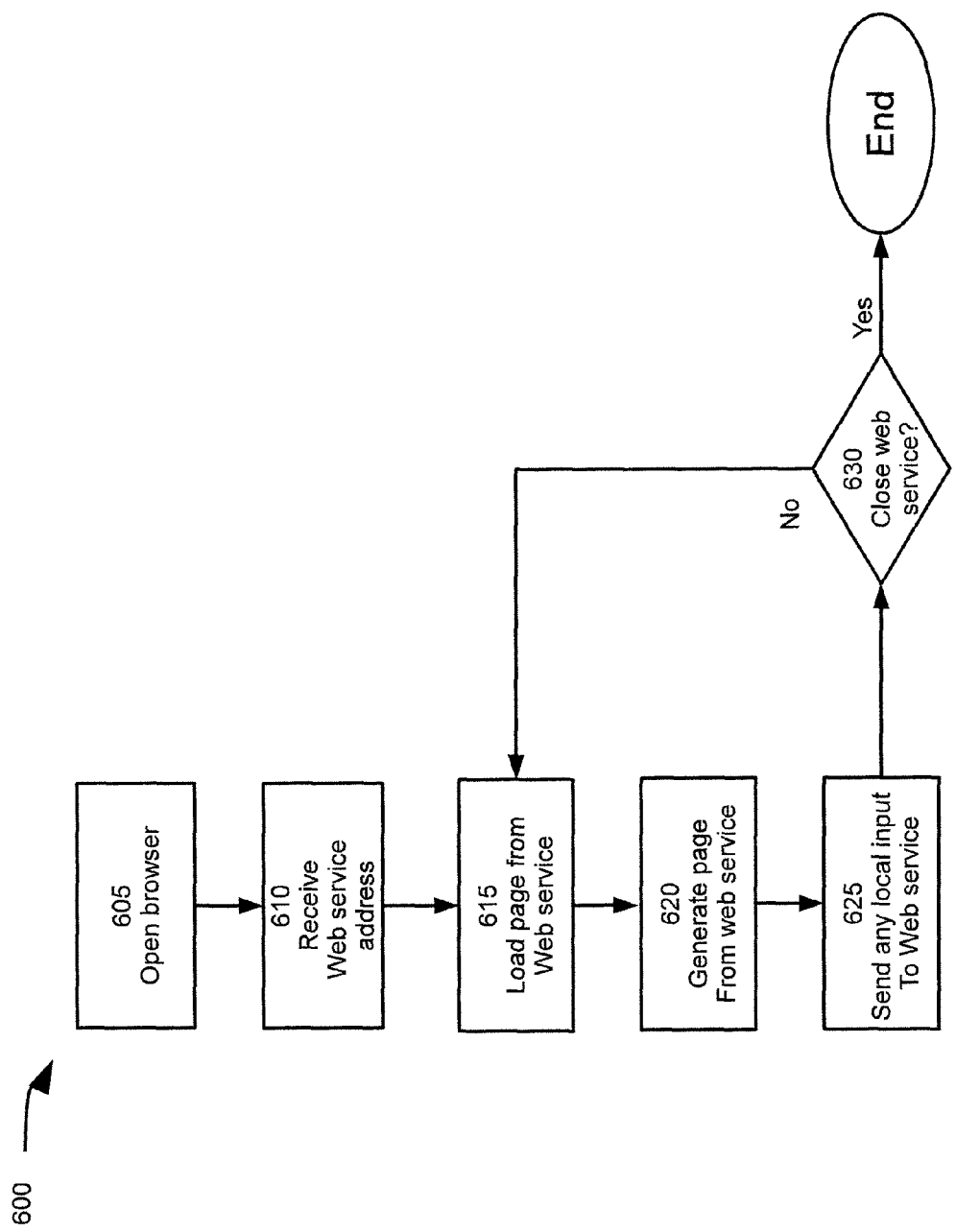
FIG. 8 shows a method of accessing an application across a plurality of computers.

Referring now to FIG. 8, a flow-chart depicting a method for accessing an application across a plurality of computers is indicated generally at 600. Method 600 can be implemented using system 50, and for purposes of explaining method 600 it will be assumed that method 600 is performed using system 50. However, it is to be understood that variations are contemplated to both method 600 and system 50 and such variations are within the scope of this specification. Performance of method 600 presumes that link 90 is active between device 54 and client machine 86.

Block 605 comprises opening a web browser. In system 50, block 605 is effected at client machine 86 whereby browser 88 is opened in the usual manner. Block 610 comprises receiving a web services address. Block 610 is effected by typing an address (e.g. http://localhost) into the address bar of browser 88. In system 50, the address received at block 610 corresponds to the address of web service 300 of host application 124. In variations, it is contemplated that system 50 may be configured so that browser 88 is automatically launched and directed to the appropriate address in a single step: for example via a desktop shortcut on client machine 86.

Figure 9:
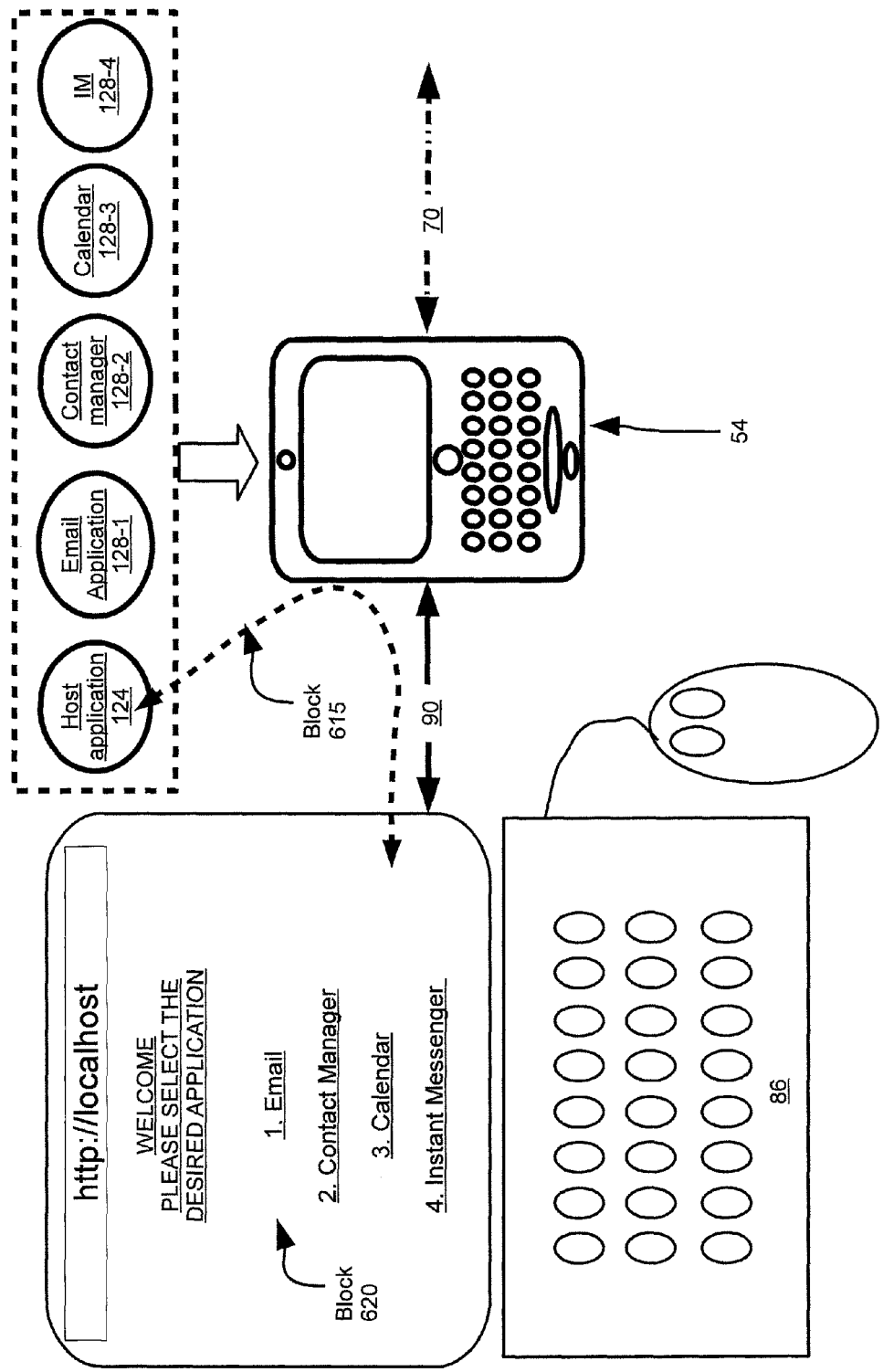
FIG. 9 shows the client machine and device of FIG. 1 in isolation and in greater detail to illustrate an example of performance of certain blocks from the method of FIG. 8.

Block 615 comprises loading a web page from the web service. In system 50, and during the initial performance of block 615, block 615 can comprise loading a webpage in the form of a menu that can be used to select invocation of any one of applications 128. An example of performance of this initial performance of block 615 is shown in FIG. 9, where browser 88 is open on the display of client machine 86, and a URL pointing to the web service 300 of host application 124 is open. Block 620 comprises generating the web page that was loaded at block 615. As can be seen in FIG. 9, host application 124 is serving a menu web page, which offers web-based access to the applications 128 that are available on device 54. Thus, as shown on the display of client machine 86 in FIG. 9, menu item one reads "Email", which is offering access to email application 128-1; menu item two reads "Contact Manager", which is offering access to contact manager application 128-2; menu item three reads "Calendar", which is offering access to contact manager application 128-3; and menu item four reads "Instant Messenger", which is offering access to instant message application 128-4. For simplicity, application 128-n is not shown in FIG. 9.

Block 625 comprises sending any local input to the web service. Block 625 is effected through browser 88 which accepts local input from the keyboard or the mouse that is connected to client machine 86. As part of that locally received input, any input that is responsive to forms or links or other input that can be entered into the page generated at block 620 is sent to the web service that originally served the page generated at block 620.

According to the example in FIG. 9, input can be received that selects one of the four menu items being generated on the display of client machine 86. To give a specific example, it can be assumed that menu item one is selected, indicating an instruction to access email application 128-1. Again, such selection can be effected via keyboard input, or by bringing a cursor into focus over the desired selection using a mouse, and then clicking the mouse to effect the selection.

Block 630 comprises determining whether an instruction has been received to close the web service. Such a determination can be based on closing browser 88, or it can be based on entry of another URL in the address bar of browser 88, or it can based on any other instruction or event that instructs closing of the web service. A yes determination ends method 600.

Figure 10:
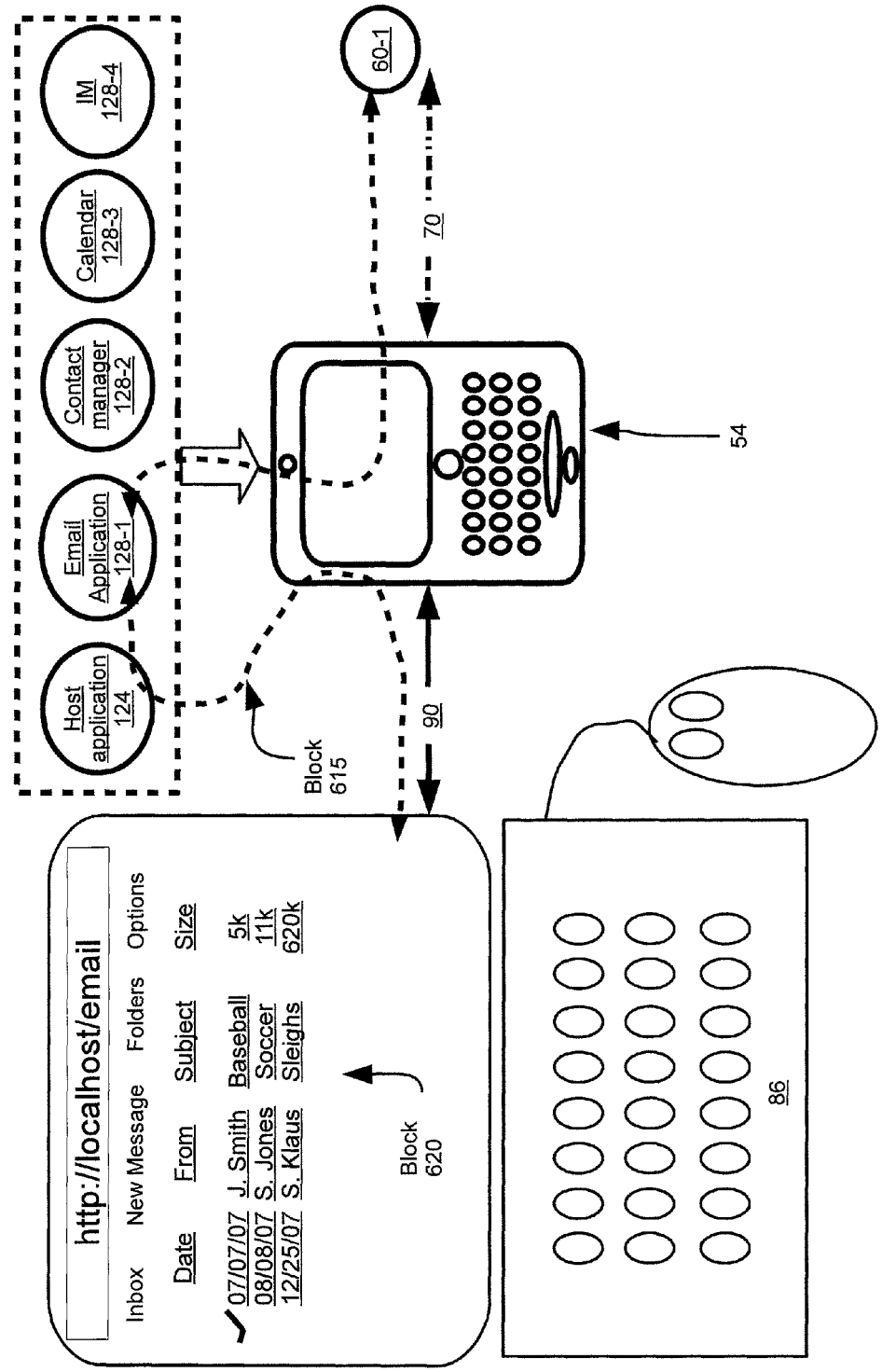
FIG. 10 shows the client machine and device of FIG. 9 to illustrate another example of performance of certain blocks from the method of FIG. 8.

A no determination leads to a return to block 615 where any updates to the web page are loaded. Thereafter, method 600 continues performance as previously described. To give further explanation, and continuing with the example above where the menu selection for email was made, then during this performance of block 615 and block 620, a web page that provides web-access to email application 128-1 will be loaded and generated. This non-limiting example is shown in FIG. 10, where browser application 86 is shown as accessing the address http://localhost/email, which is hosted by host application 124 in order to provide access to email application 128-1. When system 50 is configured using plug-ins 304, then block 615 and block 620 may likewise make appropriate use of plug-in 304-1 from FIG. 5 in order to generate the display shown in FIG. 10.

When the display shown in FIG. 10 is active, then block 525 can comprise receiving any input that is relevant to email application 128-1. For example, such input may comprise selecting "New Message", to thereby cause generation of a dialogue box on the display of client machine 86 which can be used to compose a new email message. In this example, a subsequent cycle through block 615 and block 620 would result in generation of such a dialogue box for composition of a new email message. Note that such generation is effected by host application 124 creating a web page with such a dialogue box, based on host application 124 interacting with email application 128-1, again making use of plug-in 304-1 from FIG. 5 when such a plug-in is employed.

In general, those skilled in the art will now appreciate that the data generated on the display of client machine 86 is under the control of device 54 and that client machine 86 is effectively a web-client while device 54 acts as a web-server. Furthermore, device 54 also makes use of link 70 to access the appropriate server 58 and application 60, as part of determining what data to display on the display of client machine 86. Again, in the example of email, email application 128-1 accesses application 60-1 on server 58-1 in order to send new emails generated using client machine 86 and by the same token, email application 128-1 accesses application 60-1 in order to receive new emails, which are in turn generated on the display of client machine 86. Any other functions normally associated with email application 128-1 are likewise reflected on the display of client machine 86 and appropriate access to server 58-1 is effected accordingly. In addition to static web pages, browser 88 may be configured to receive code (e.g. JavaScript code) from host application 124. While executing this code, browser 88 may, from time to time, (e.g. possibly in response to user input or some other condition), request additional resources from host application 124 in order to update the page currently on the display without loading an entirely new page.

In order to configure browser 88 to respond to changes that occur on device 54, or on server 60, an "open-get" or equivalent programming function is employed so that browser 88 will automatically receive and respond to such changes. For example, assume that a new email message arrives on server 58-1, and that same new email message automatically arrives on device 54. The "open-get" function running on browser 88 will result in browser 88 also ascertaining the arrival of the new email message and result in the display of client machine 86 being updated accordingly to reflect the arrival of the new email message.

Figure 11:
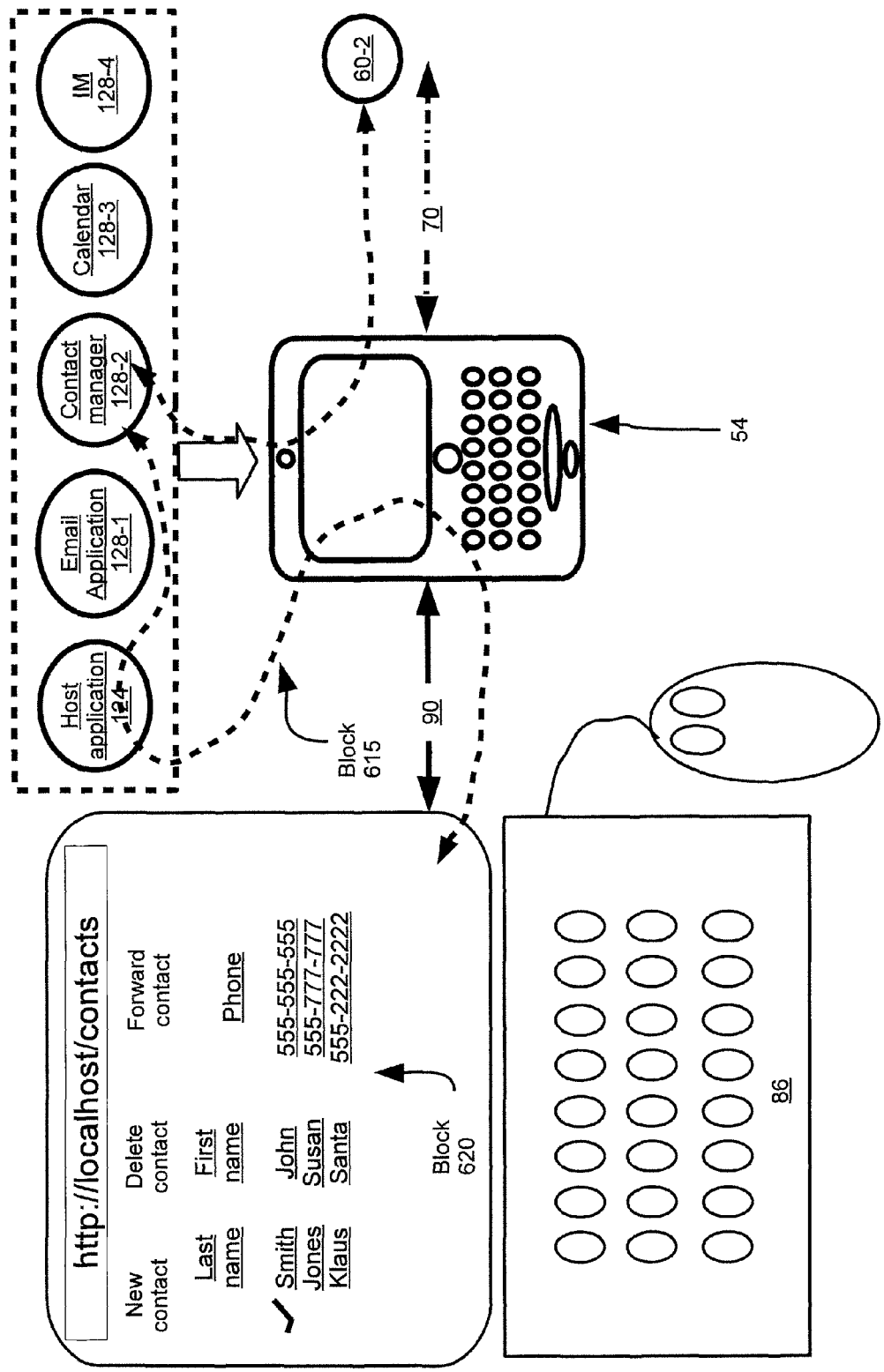
FIG. 11 shows the client machine and device of FIG. 9 to illustrate another example of performance of certain blocks from the method of FIG. 8.

To help further illustrate the present specification, FIG. 11 shows a non-limiting example of the result of selecting contact manager application 128-2. In FIG. 11, the URL http://localhost/contacts is active and accordingly the web service 300 of host application 124 is accessing contact manager 128-2 so that input relative to contact manager application 128-2 can be received via client machine 86, and likewise, the display of client machine 86 can be controlled to display content relative to contact manager application 124. Again, changes to the contact database can be made on client machine 86, or they can be made on device 54. Such changes can then be propagated to server 60-2 in the usual manner.

Those skilled in the art will now recognize how the foregoing can extend to calendar application 128-3, instant messenger application 128-4 and other applications 128-*n*.

Various advantages will now be apparent. For example, it is common that communications between device 54 and servers 58 may be effected via encrypted links. Accordingly, when link 90 is active, a full browsing experience, complete with full size display and full size keyboard, can be used to interact with various applications on device 54 but such interactions will be encrypted and secure. Furthermore, in certain situations link 94 may not be available, or of limited use, due to security restrictions, usage fees, or of low bandwidth and accordingly accessing data on servers 58 from client machine 96 via link 94 may not be possible or may be impractical. Nonetheless, it may be desired to use client machine 86 for such interactions, rather than device 54, due to the availability of the full keyboard, mouse and regular display that is available on client machine 86. Accordingly, the present specification may be most useful when device 54 is near enough to a given client machine 86 in order to establish link 90. Such client machines 86 are ubiquitous in air port lounges, hotel rooms, Internet cafes and other locations. Accordingly, for at least these reasons, this specification can be used to provide access to various applications from such client machines 86 in a novel, inventive and useful manner. It should also be noted that client machine 86 may have different configurations, and could include, for example, a tablet computer.

Variations, subsets, enhancements and combinations of the foregoing are contemplated. For example, none of the screen shots shown in FIG. 9, FIG. 10 or FIG. 11 should be construed as being limiting as to exactly how data is generated on the display of client machine 86.

Furthermore, in relation to proxy application 308 in FIG. 7, it may be unlikely that publicly available client machines 86 will have proxy application 308 pre-installed, so as noted proxy application 308 may be stored in non-volatile storage 104 on client device 54. Further, it should be noted that non-volatile storage 104, itself, can be implemented as a removable storage media such as an SD card. Using a USB connection that proxy application 308 may be downloaded from the SD card to the client machine 86. Device 54 may also be configured so that it includes an auto-executable file which immediately executes on client machine 86 upon connection to client machine 86, and automatically copies proxy application 308 to the client machine 86. (Alternatively, device 54 can be configured so this installation is performed manually). After proxy application 308 has started, link 90 may be implemented via the USB connection or Bluetooth pairing or by other means. In the case of Bluetooth, the pairing step with client machine 86 could happen in a number of ways. For example, a scan for Bluetooth devices may be initiated from either device 54 or client machine 86 or both in the usual way. Alternatively, as part of proxy application 308, the client machine 86 may be configured to display a barcode that can be scanned using optical capture unit 176. The barcode data may comprise configuration information usable by device 54 to establish pairing with client machine 86.

When a "yes" decision is reached at block 630, client machine 86 may be configured to clear ifs browser cache to ensure that private data has been cleared from the client machine's 86 memory. The "yes" determination at block 630 may be reached a number of ways: device 54 may be manually logged off from client machine 86; link 90 may be terminated by unplugging a USB cable used to establish link 90; link 90 may be a Bluetooth connection. An inactivity timer may be used to reach the "yes" determination at bock 630.

Alternatively, client machine 86 may operate in a no-cache mode when connected to device 54. In this mode, performance may be somewhat degraded since browser 86 may download content more often.

As noted above, device 54 runs a host application 124 that may be configured to listen to a real time communication channel, such an instant messaging conversation via instant message application 128-4. JavaScript may be executing on browser 88, such JavaScript having been provided by host application 124. This JavaScript maintains an open connection with the host application 124. When an event occurs in application 128-4, it is returned to the JavaScript so that corresponding changes occur on the display of client machine 86 under the control of browser 88. If an instant message reply is sent from the browser 88, then a separate parallel connection is opened and the commands are sent to host application 124 which then injects them into the ongoing conversation within instant message application 128-4.

In general, it can be noted that there are many applications 128 (with corresponding data sources and networking applications 60) on devices like device 54, including without limitation email, contacts, calendar, etc. Using this specification, each application 60 and its data may be rendered using browser 88 in a customized manner. Also, newly-installed and newly-created applications 128 may be readily added as available through browser 88 by creating a new application plug-in 304 for each new application 128. Host application 124 is configured to allow for ongoing registrations of new plug-ins 304. In effect, device 54 provides an application programming interface (API) associated with host application 124 that allows any application 128 running on the device 54 to register as a data source. Each application 128 can be assigned its own URL prefix and a handler class that implements a particular interface. All hypertext transfer protocol (HTTP) requests from client machine 86 for URLs with that prefix may be given to the handler class to be processed. The HTTP handler may respond to each request in any way that it sees fit, so it is in control of the data rendering. Because registration of applications 128 with host application 124 may be dynamic, it is not needed to compile host application 124 to be limited to only those applications 128 installed at the same time as host application 124 is installed. Newly-installed applications can register at which point they will dynamically appear as being available through browser 88. Host application 124 can also dynamically enumerate all of the registered applications 128 at the time of creating a menu screen such as the menu screen shown in FIG. 9.

Figure 12:
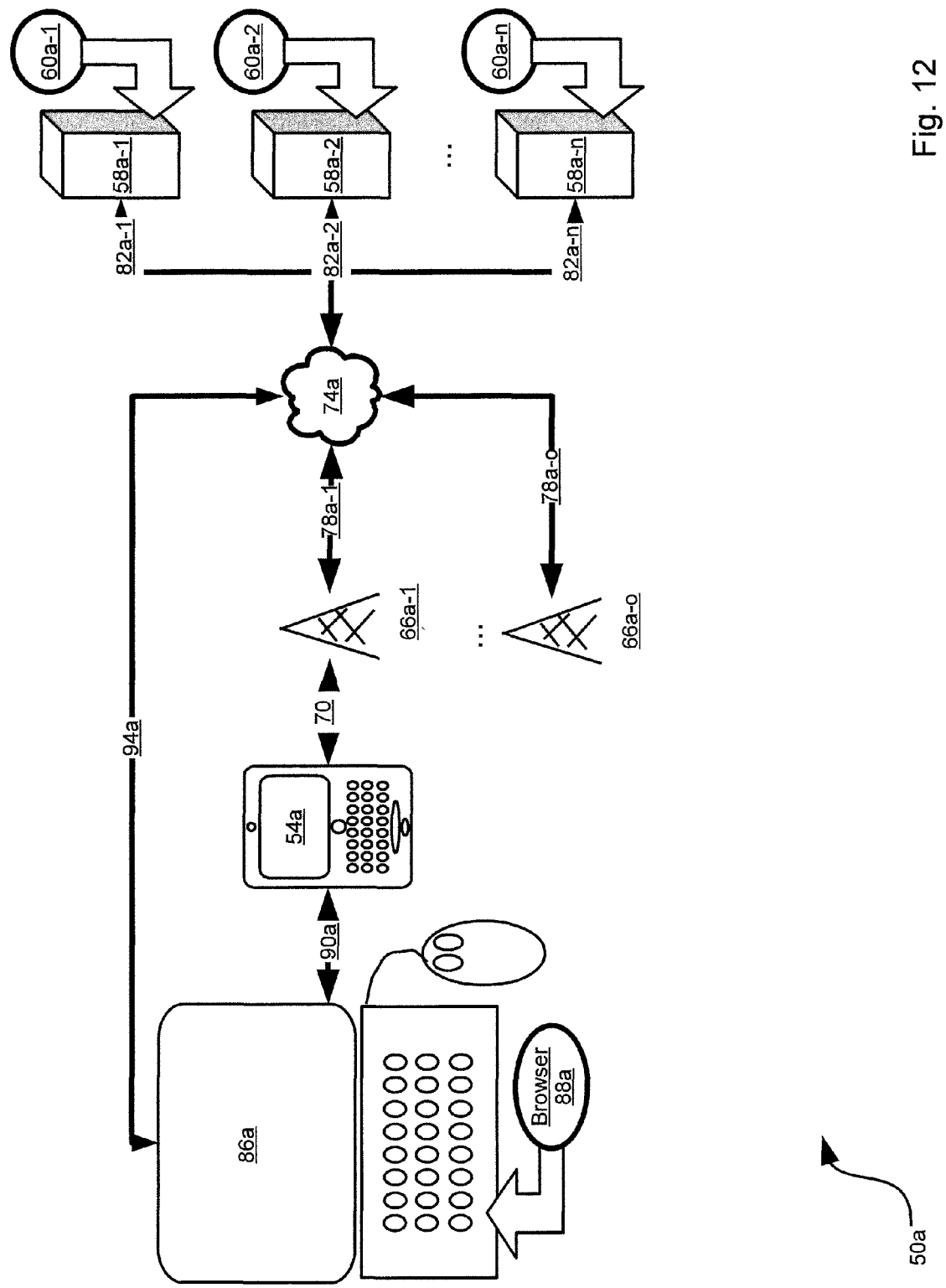
FIG. 12 is a schematic representation of a system for providing event notifications across a plurality of computers.

Referring now to FIG. 12 a system for providing event notifications across a plurality of computers is indicated generally at 50a. System 50a is a variation on system 50 and thus like elements bear like references to their counterparts in system 50, except followed by the suffix "a". System 50a can be built on system 50 and its variants, and thus the particular variations of system 50a will become clearer in the following discussion.

Figure 13:
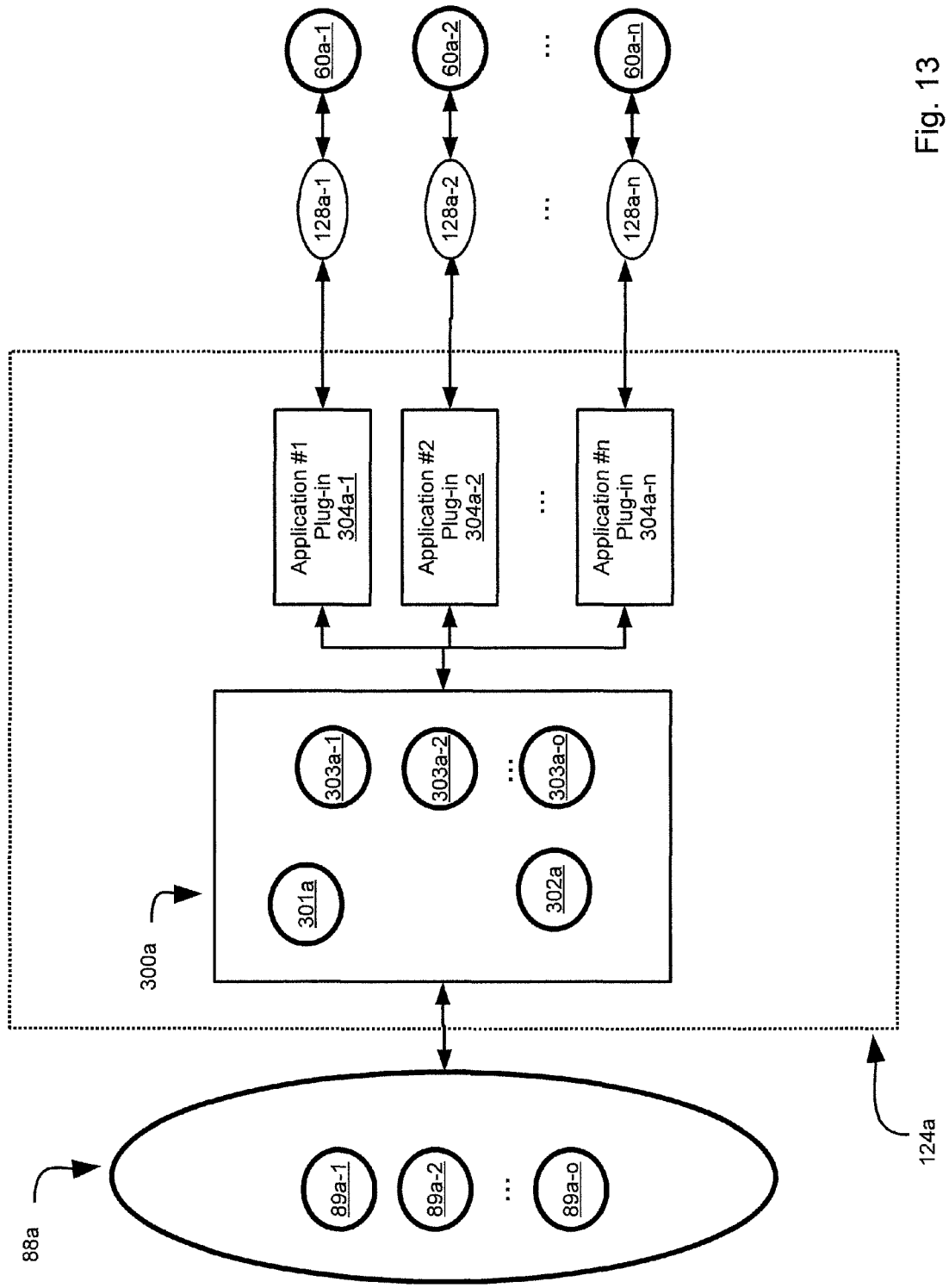
FIG. 13 is a block diagram showing a non-limiting example of a variation of the host application in FIG. 5 for incorporation into the system of FIG. 12.

Such variations become clearer in FIG. 13. FIG. 13, which is a variation on FIG. 5, shows a block diagram of an example an implementation of host application 124a and its virtual connections to browser 88a and applications 128a. It can be noted that, according to the variation in FIG. 13, host application 124a may be modified to more permanently include application plug-ins 304a or applications 128a themselves, or all of them within host application 124a, thereby foregoing the modularity of plug-ins 304a.

In FIG. 13, browser 88a is shown as including one or more asynchronous request modules 89a, and web service 300a is shown as including an asynchronous response module 301a and a queue manager 302a. It is to be understood by those skilled in the art that the term "module" need not be construed in a limiting sense, and can comprise various software structures (e.g. objects, libraries, classes, applets, functions, combinations thereof, etc.) that may be incorporated directly into, or connected to, other software components discussed herein.

FIG. 13 also shows three queues 303a within web service 300a. Note that each queue 303a may simply be a pointer to a memory location in storage unit 104 or storage unit 108 which contains the relevant data. Also note that there is no requirement that queues 303a (or indeed any other module 301a, 302a) be actually maintained within web service 300a. These components may be architected and organized differently within device 54a.

As will be discussed further below, a queue 303a is provided respective to each request module 89a, and the existence of queue 303a assumes that a given queue 303a has been created and is active.

Asynchronous request module(s) 89a may be implemented using one or more web development techniques, such as that group of techniques generally referred to as Asynchronous JavaScript and extensible Markup Language (XML) (AJAX). Making asynchronous requests via asynchronous request module 89a allows browser 88a to continue running while browser 88a is waiting for responses to arrive. For example, assume that the page corresponding to http://localhost/email as shown in FIG. 10 is being generated on client machine 86. Asynchronous request module(s) 89a may execute while the display of client machine 86 shown in FIG. 10 is being generated, without interrupting the appearance of display on client machine 86. An example of asynchronous request that could be handled by asynchronous request module 89a would involve requesting whether any new email has arrived that should be generated on the display of client machine 86. Responses to such requests would result in new email appearing on the inbox shown on the display of client machines 86 shown in FIG. 10, thereby giving the effect of email being pushed to the client machine 86.

As another example, assume that the page corresponding to http://localhost/contacts as shown in FIG. 11 is being generated on client machine 86. Asynchronous request module(s) 89*a* may execute while the display of client machine 86 shown in FIG. 11 is being generated, without interrupting the appearance of display on client machine 86. An example of asynchronous request that could be handled by asynchronous request module 89*a* would involve requesting whether any changes to the contact database have occurred that should be generated on the display of client machine 86. Responses to such requests would result in such changes to the contact database to appear show in on the display of client machines 86 shown in FIG. 11, thereby giving the appearance of such database changes being pushed to the client machine 86.

Other example for uses of asynchronous request modules 89*a* will now occur to those skilled in the art.

It can also be noted that multiple web browsers, or multiple tabs within a web browser, may be open on client machine 86. For example, multiple instances of web browser 86*a*, or multiple tabs with web browser 86*a* may be open to http://localhost/email. In this circumstance, multiple asynchronous request modules 89*a* can be active for each instance of the web page corresponding to http://localhost/email. As will be discussed further below, asynchronous response module 301*a* and queue manager 302*a* are configured so that each instance is updated for new events so that the display of each instance remains substantially identical, but without sending duplicate copies of a response to a given instance.

In order to coordinate requests between a request module 89*a* and a response module 301*a*, each request module 89*a* is configured to generate a unique identifier that is used in communications with the response module 301*a*. One way of generating such a unique identifier is to configure request module 89*a* to select a random integer from a large range, which will result in a unique identifier with high probability, which thereby avoids any complex request module 89*a* registration protocol, although if desired such a complex registration protocol may be employed.

Response module 301*a* is configured so that when it receives a request from request module 89*a*, response module 301*a* will determine whether a queue exists related to the provided unique identifier. If no queue exists, then response module 301*a* creates a queue 303*a* related to that unique identifier associated with the originating request module 89*a*. Response module 301*a* is configured to then check whether there are any events present in the related queue. If so, in one implementation, response module 301*a* is configured to remove the first event from the queue 303*a* and returns the data for that event to the originating request module 89*a*. If the queue 303*a* is empty, then the response module 301*a* holds the request open, waiting for an event to arrive in the related queue. When an event arrives, the response module 301*a* removes the event from the queue 303*a* and returns the data for that event to the client.

Each application 128 that is executing may be configured to generate events which are returned to a request module 89*a* respective to a given application 128. When an application 128 generates an event it is placed in an appropriate queue response module 301*a* which examines all of existing queues and places the data for that event in any appropriate target queue.

Queue manager 302*a*, which is configured to work in conjunction with response module 301*a*, is configured to determine whether each particular queue 303*a* is active, and if not active, then queue manager 302*a* will delete the queue 303*a*. The queue 303*a* may be determined to be active if, for example, one of the following conditions is met: a request module 89*a* is currently waiting for an event to arrive in queue; or the elapsed time since an event was returned from that queue 303*a* to request module 89*a* is below a particular threshold. This second condition is provided so as to account for the fact that a request module 89*a* may not currently be waiting for an event if it is currently processing the last event that was returned to it. Thus the threshold is set to a value that reflects the amount of time expected to process an event by browser 88*a* In the event, however, each request module 89*a* is expected make a subsequent request to the server within a relatively short period of time to issue a request for the next event.

In general, response module 301*a* and queue manager 302*a* are configured to place events into appropriate active queues 303*a*, while queue manager 302*a* is configured to remove every inactive queue 303*a* from its list of queues 303*a*. Queued events are returned to request modules 89*a* as described above.

Figure 14:
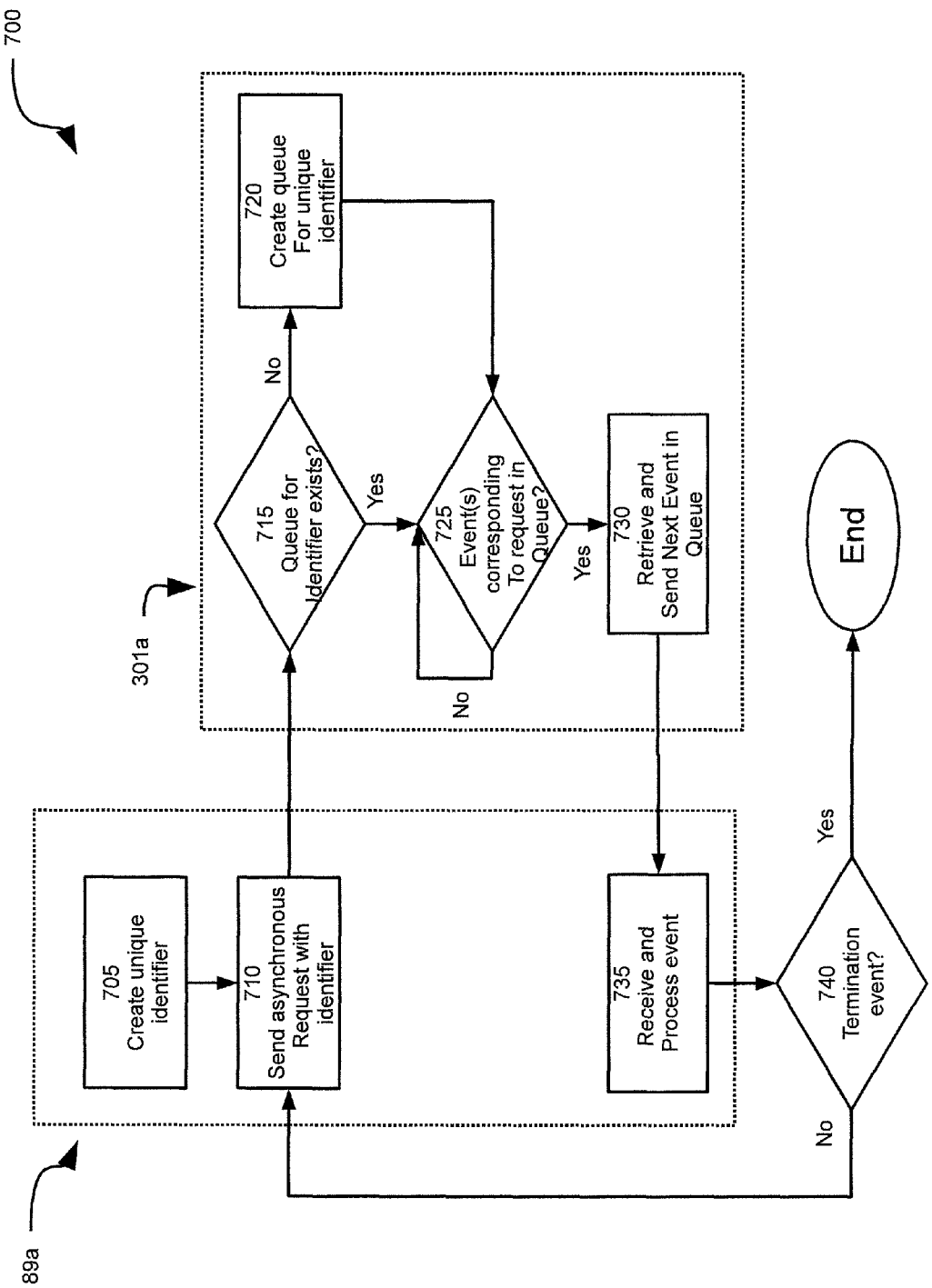
FIG. 14 is a flow-chart depicting a method of providing event notifications across a plurality of computers.

Referring now to FIG. 14, a method of providing event notifications across a plurality of computers is depicted in the form of a flow chart that is indicated generally at 700. Method 700 can be implemented on system 50*a*, or a variant thereon. However, method 700 is described for illustrative purposes in relation to system 50*a*, and thus those blocks of method 700 that are performed by request module 89*a* are denoted by a stippled-line box encircling those blocks. By the same token, those blocks of method 700 that are performed by response module 310*a* are denoted by a stippled-line box encircling those blocks.

Method 700 can be performed as a part of performance of block 620 of method 600.

Block 705 comprises creating a unique identifier. In a present example, block 705*a* is performed by a request module 89*a* that is respective to a given web page that is open client machine 86 that is respective to a given application 128*a*. As noted above, one way of generating a unique identifier is to select a random integer from a large range, which will result in a unique identifier with high probability.

Figure 15:
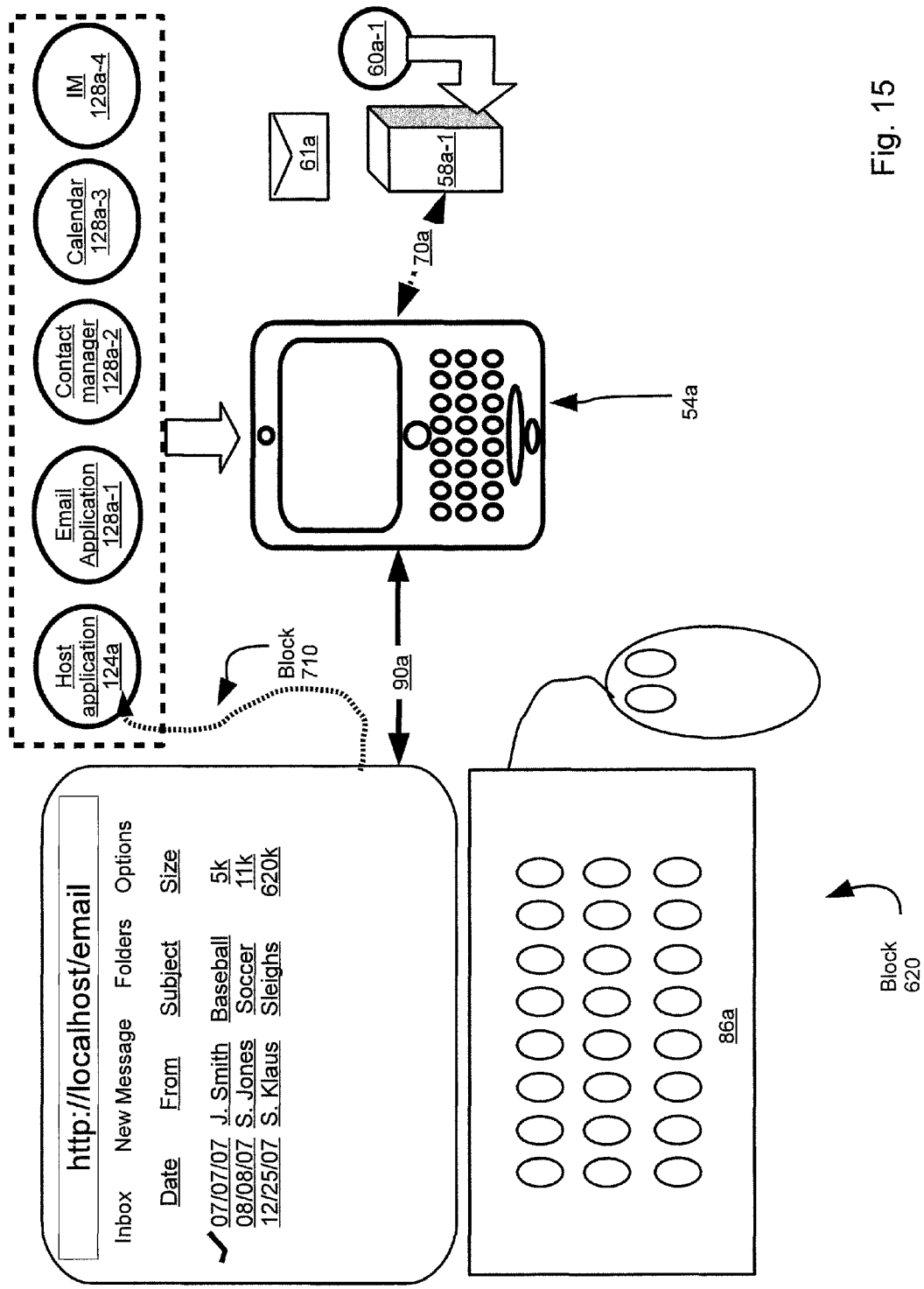
FIG. 15 shows the client machine and device of FIG. 12 to illustrate example performance of certain blocks of the method of FIG. 14.

Block 710 comprises sending an asynchronous request with the identifier from block 705. Again, the nature of the request is not particularly limited, and can generally correspond to any aspect of a particular application 128*a* where events within that application 128*a* are ultimately relevant to the web page on client machine 86*a* that initiates method 700. To help illustrate, however, FIG. 15 shows the generation of a web page on the display of client machine 86*a* that corresponds to email application 128*a*-1, having the URL http://localhost/email. The request at block 710, in this example, is a check for whether any new email messages have been received in device 54 that should be made available on client machine 86*a*. Thus, the asynchronous request in FIG. 15 is labeled at block 710.

When the request is received at device 54*a*, then block 715 commences. Block 715 comprises determining if an event queue 303*a* for the identifier associated with the request at block 710 exists. If no queue 303*a* exists, then at block 720 such a queue 303*a* is created so that future events which are received at device 54*a* for the relevant application 128 can be stored in that queue. In the example in relation to FIG. 15, the future events comprise the receipt of new email messages.

Block 725 comprises determining if any events corresponding to the queue 303*a* associated with the identifier from block 705 exists. A "no" determination results in a "wait" state where block 725 continues to be invoked until an event is received. While not shown in FIG. 14 for ease of illustration, it is to be understood that interrupt modules are typically employed so that on a termination event occurring during the loop at block 725 will result in termination of the loop. Termination events are discussed below in relation to block 740, but may comprise, by way of non-limiting example, any breakage of link 70a, or a closure of the web page that resulted in the original generation of the request at block 710.

A "yes" determination at block 725 leads to block 730. A "yes" determination is reached when one or more events are found within the queue 303a contemplated at block 725.

Figure 16:
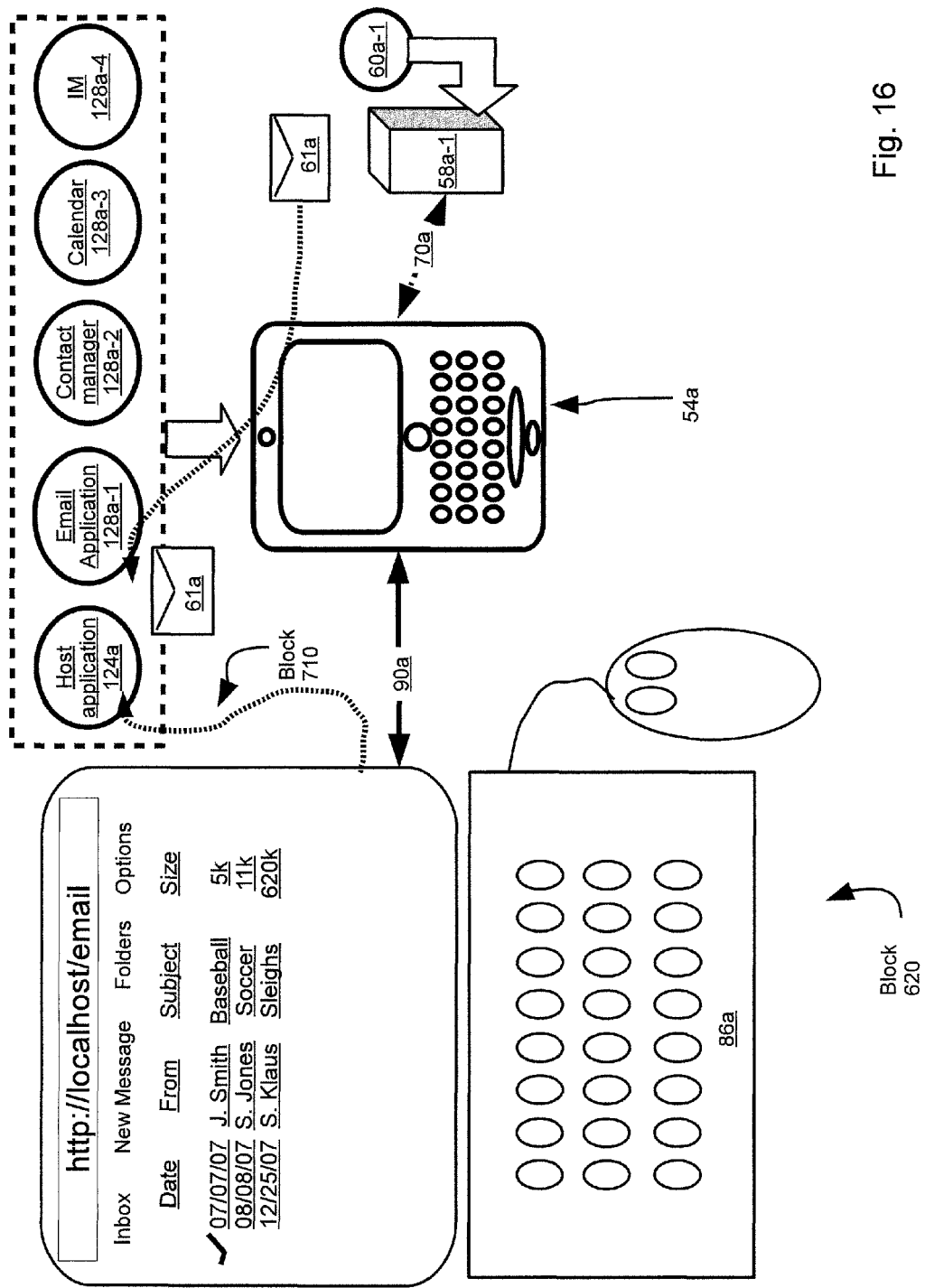
FIG. 16 shows the client machine and device of FIG. 12 to illustrate example performance of certain blocks of the method of FIG. 14.

The means by which the queue 303a is populated with an event is not particularly limited. However, an illustrative example of populating of a queue 303a in relation to email application 128a-1 is represented in FIG. 15 and FIG. 16. In this case, the event is the arrival of a new email, and the data associated with the event is the email itself. In FIG. 15, an email 61a is shown located at server 58a-1 in conjunction with application 60a-1. However since that email has not been delivered to device 54a, the queue 303a contemplated in FIG. 15 remains empty. In FIG. 16, email 61a is shown as having been received by email application 128a-1, and is therefore, via application plug-in 304a-1 working in conjunction with response module 301a and queue manager 302a, placed within a queue 303a that is accessible by response module 301a.

Figure 17:
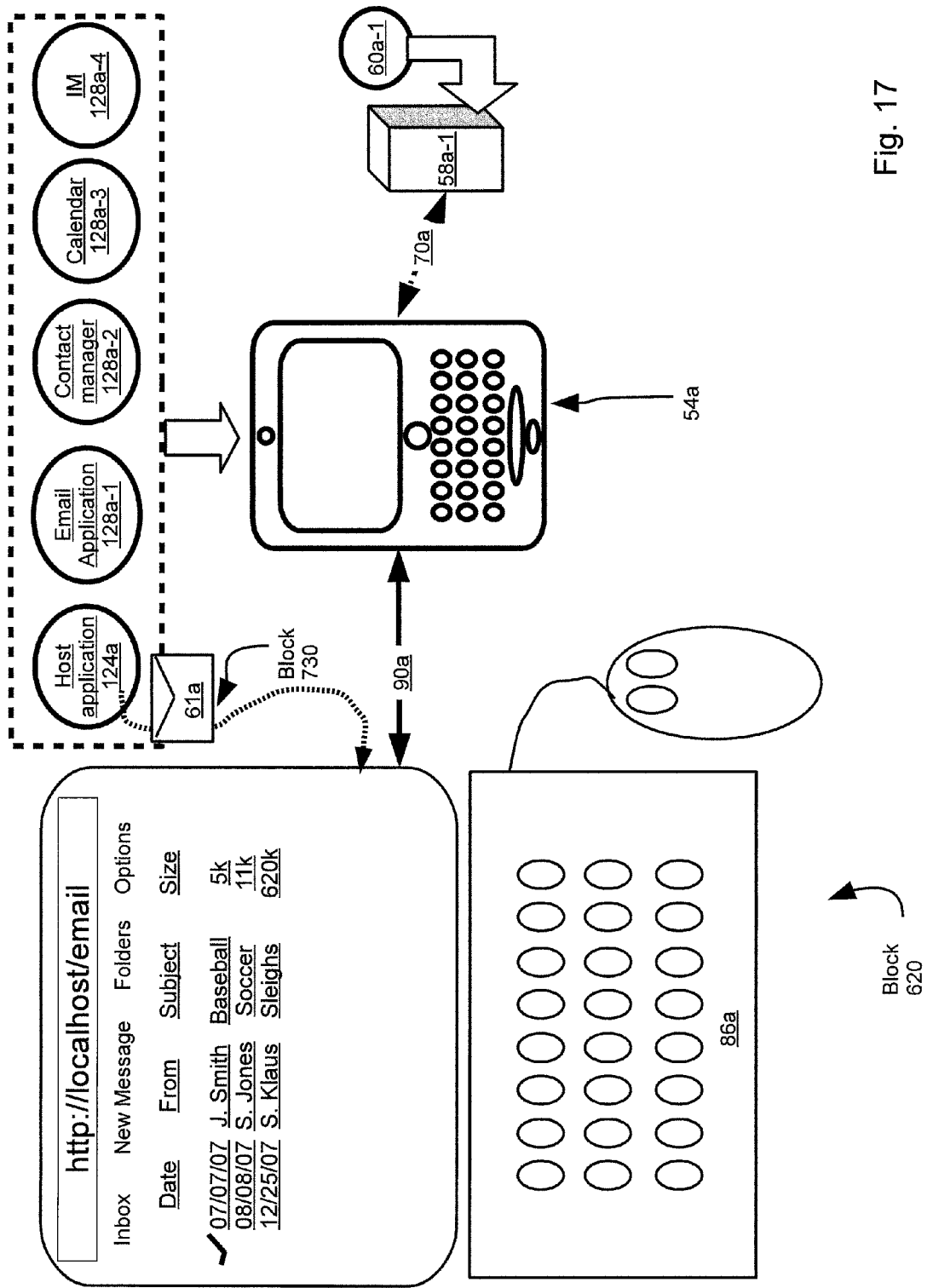
FIG. 17 shows the client machine and device of FIG. 12 to illustrate example performance of certain blocks of the method of FIG. 14.

Block 730 comprises retrieving and sending the next event in the queue. In a present implementation, it is contemplated that where the queue 303a has multiple events stored therein, only the first item in the queue 303a would be retrieved and sent, leaving the remaining items in the queue 303a for subsequent cycling through method 700. Example performance of block 730 is shown in FIG. 17, where email 61a is sent from device 54a to client machine 86a.

Figure 18:
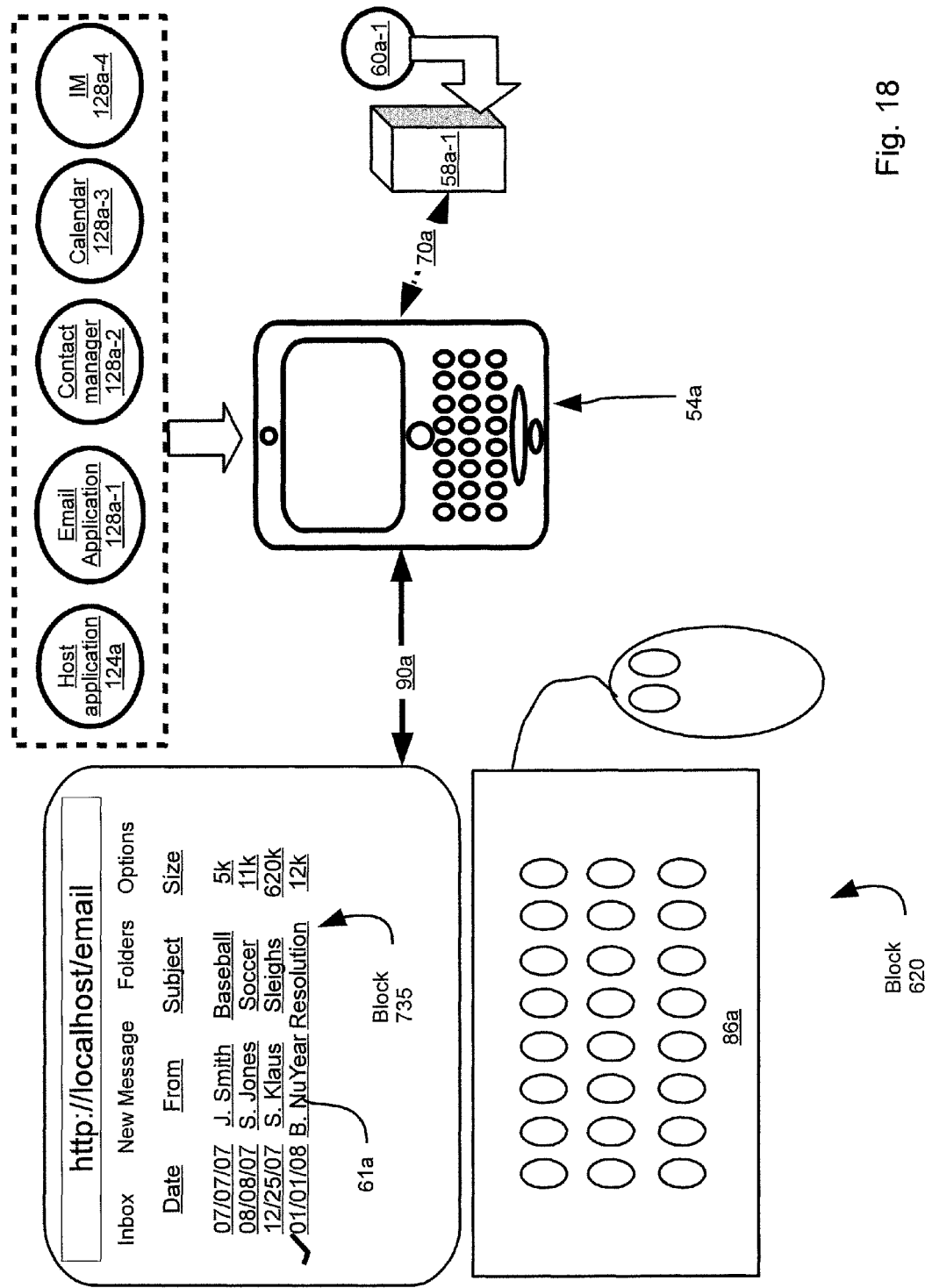
FIG. 18 shows the client machine and device of FIG. 12 to illustrate example performance of certain blocks of the method of FIG. 14.

Block 735 comprises receiving and processing the event. Block 735 thus responds to the event sent at block 730, and upon its receipt, is processed locally at the receiving client machine 86a according to the programming instructions associated with the web page associated with request module 89a. Example performance of block 735 is shown in FIG. 18, where email 61a is shown as a newly received email within the "inbox" on the display of client machine 86a, as a new email with the date "Jan. 1, 08", and from "B. NuYear", with the subject "Resolution" and having a size of "12 k".

Block 740 comprises determining if a termination event has occurred, in which case method 700 ends. Block 740 can be performed by either client machine 86a or device 54a or both of them and it is for this reason that block 740 is not illustrated in association with either. What constitutes a termination event is not particularly limited, and can comprise, by way of non-limiting example, termination of link 90a, closing of web browser 88a, powering off of device 54a. Also as noted is that block 740 can be performed in parallel with any of the other blocks in method 700.

Where a termination event does not occur, then a "No" determination is made at block 740 and method 700 returns to block 710 at which point another asynchronous request is sent, which reuses the identifier generated at block 705. Assuming a queue 303a corresponding to that identifier exists, then asynchronous response module 301a will directly traverse from block 715 to block 725, bypassing block 720.

It will now be more apparent that the requests generated at block 710 can be asynchronous in relation to the populating of the corresponding queue 303a. Where the queue 303a is empty, then the wait state at block 725 is effected until the queue 303a is populated. Conversely, if the queue 303a contains more than one entry, then each individual event in the queue 303a is sent, one at a time, once during every pass through block 730, until the queue is empty. However, at the speed at which method 700 can be configured to occur, even considering for the asynchronicity, very little time need actually pass between the arrival of an event (e.g. an email message) at device 54a, and the appearance of that event (e.g. a new email in the inbox) on the display of client machine 86a. The amount of time that actually passes can, in certain configurations, be in the order of a few milliseconds.

Queue manager 302a is provided to help further manage queues 303a. As discussed above, applications 128a running on device 54a generate events which are populated into any active queues 303a. Queue manager 302a examines all of the queues 303a to determine if they are active. Queue manager 302a determines that a particular queue is "active" if one of the following conditions is met:

1) a request module 89a is currently waiting for an event to arrive in a respective queue 303a. This condition corresponds to method 700 remaining at the wait state at block 725.

2) the elapsed time since an event was returned from that queue to a client is below a particular threshold. This condition corresponds to a period of time since block 730 was commenced. Note that this second condition is provided to account for the fact that block 735 may be occurring, since browser 88a may actually be handling the event received at block 735. Thus, at block 735, browser 88a may not currently be waiting for an event since it is currently processing the last event that was returned to it. In that case, however, queue manager 302a still expects a further invocation of block 710, involving a subsequent request to response module 301a, within a relatively short period of time. If this time period is exceeded, then a determination is made that the particular queue 303a is not active.

In the event that a given queue 303a is determined to be active, then queue manager 302a places the event into every active queue 303a corresponding to that application.

In the event that a given queue 303a is determined to be inactive, then queue manger 302a removes that queue from its list of queues.

Various circumstances may arise leading to termination of the cycles of requests and response. For example, if request module 89a is waiting for response, but the underlying data connection is lost (e.g. link 90 is terminated), then response module 301a will abandon queues created responsive to requests generated by request modules 89a.

Various advantages will now be apparent. For example, dynamic creation of queues and deletion of those queues makes efficient use of processor resources. More specifically, each request module 89a has the ability to cause the creation a new queue 303a of events that will be returned to the unique request module 89a, and once the client has stopped making requests, the queue 303a will be removed automatically. This can obviate or mitigate the need for complicated registration protocols and accommodates connections that are dropped without any formal handshake. The determination of whether a queue 303a is active, and the fact that response module 301a can be configured to examine whether a request module 89a is waiting, reduces the likelihood of race conditions between events arriving within host application 124a and requests from request modules 89a. Taken together, these techniques allow any number of individual request modules 89a associated with different instances of web pages on client machine 86 to reliably receive pushed events one at a time, and in an orderly manner.

Figure 19:
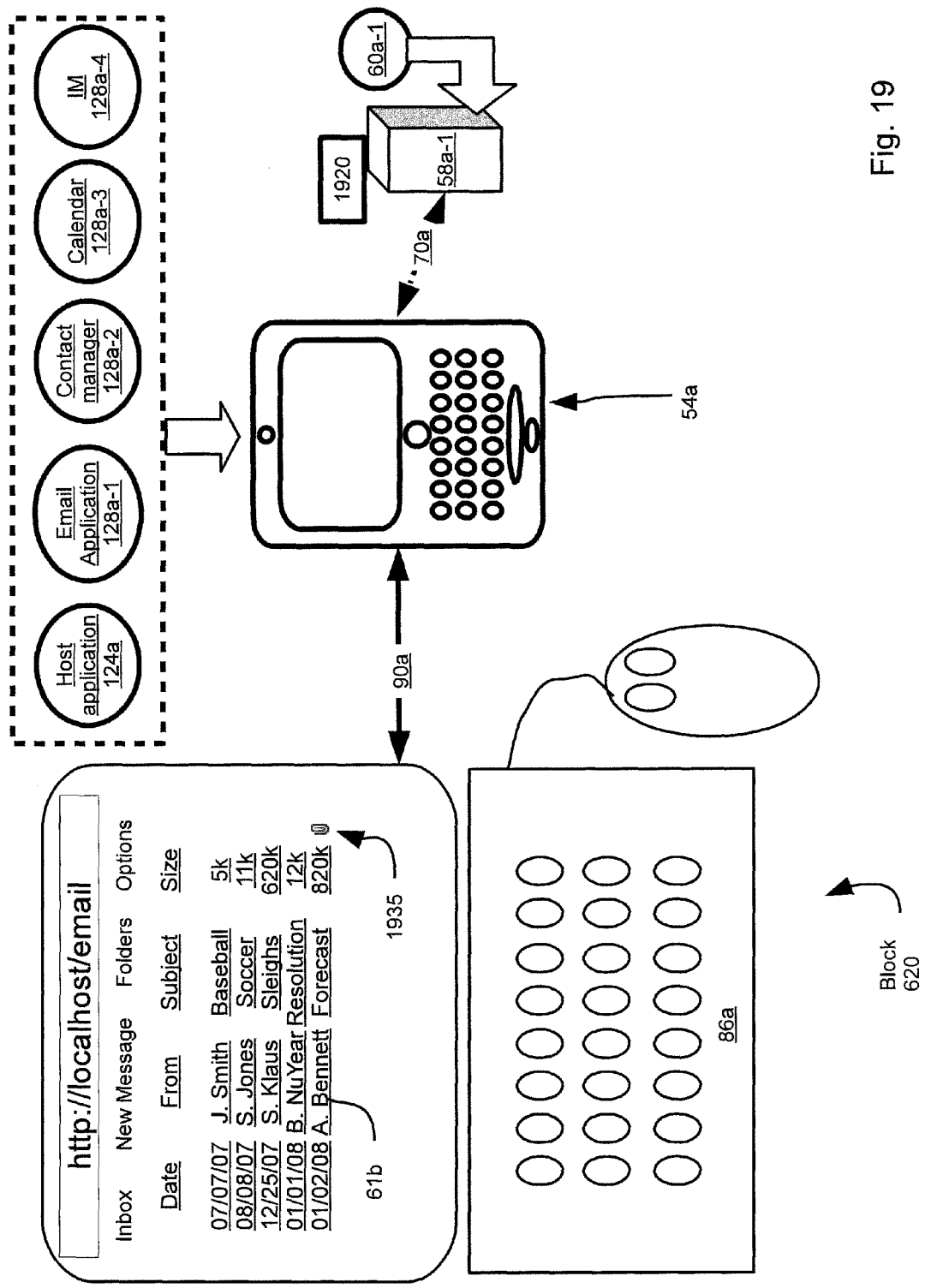
FIG. 19 shows the client machine and device of FIG. 12 to illustrate example performance of controlling transmission of an attachment to an email using a plurality of computers.

Attention is now directed to FIG. 19, which is substantially similar to FIG. 18 with like elements having like numbers, however, it is appreciated that a further e-mail (email 61b) has been received within the "inbox" on the display of client machine 86a, as a new email with the date "01/02/08 ", and from "A. Bennett", with the subject "Resolution", having a size of "820k" and associated with an attachment 1920 as indicated by indicator 1935. It is further appreciated that while e-mail 61 *b* has been received, attachment 1920 has not been transmitted with e-mail 61*b*, but rather an indication of attachment 1920 was received with e-mail 61*b*, triggering display of indicator 1935. Hence, attachment 1920 can be downloaded or not as desired. Furthermore, attachment 1920 is stored at server 58*a*-1. Alternatively, attachment 1920 can be stored at an attachment server (not depicted) or any other suitable server.

Figure 20:
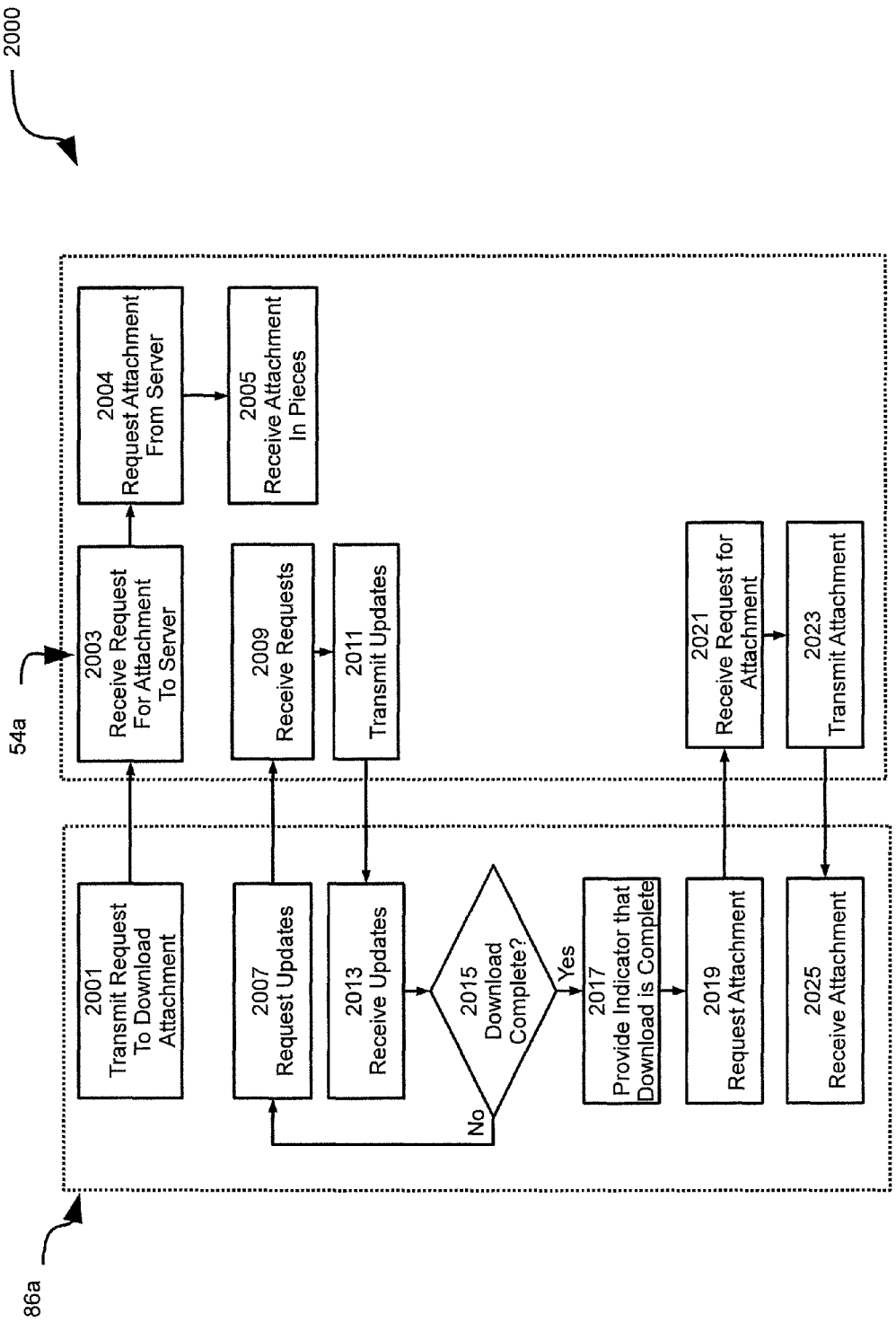
FIG. 20 is a flow-chart depicting a method of controlling transmission of an attachment to an email using a plurality of computers.

Attention is now directed to FIG. 20, which depicts a method 1900 for controlling transmission of an attachment to an email using a plurality of computers. Method 1900 can be implemented on system 50*a*, or a variant thereof. However, method 1900 is described for illustrative purposes in relation to system 50*a*, and thus those blocks of method 1900 that are performed by computing machine 86*a* are denoted by a stippled-line box encircling those blocks. By the same token, those blocks of method 1900 that are performed by mobile computing device 54*a* are denoted by a stippled-line box encircling those blocks. Furthermore, method 1900 presumes that connection 90*a* has been established between computing machine 86*a* and mobile computing device 54*a*, mobile computing device 54*a* in communication with server 70*a* storing attachment 1920.

Figure 21:
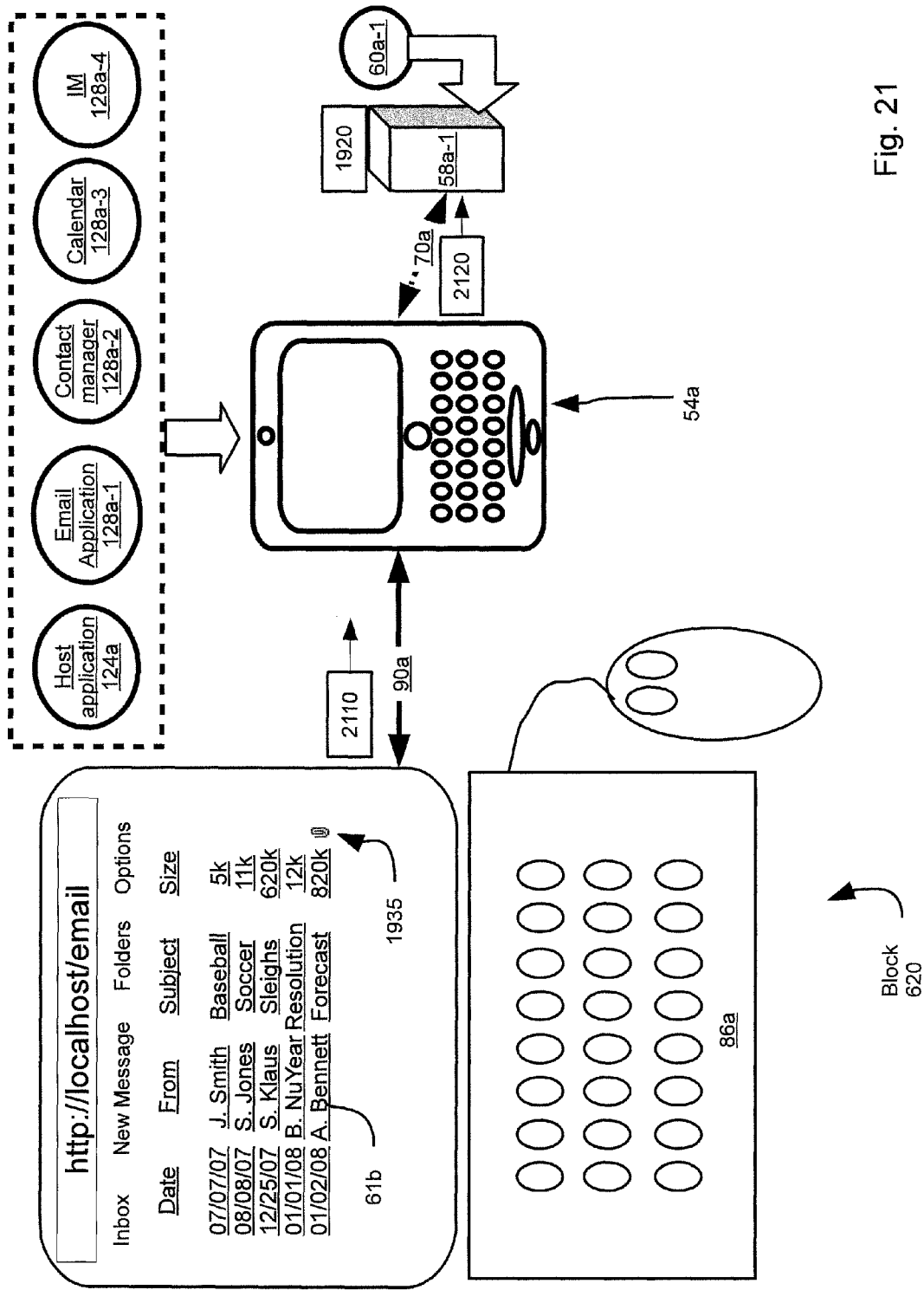
FIG. 21 shows the client machine and device of FIG. 12 to illustrate example performance of certain blocks of the method of FIG. 20.

At block 2001 a request 2110 to download attachment 1920 is transmitted from computing machine 86*a* to mobile computing device 54*a*. In some implementations, request 2110 (depicted in FIG. 21) can be initiated when indicator 1935 is selected at computing machine 86*a*. Request 2110 is then generated via method 700, for example at blocks 705-710.

At block 2003, mobile computing device 54*a* received request 2110, and in turn requests attachment 1920 from server 58*a*-1 via a request 2120 transmitted via link 70*a* at block 2004.

Figure 22:
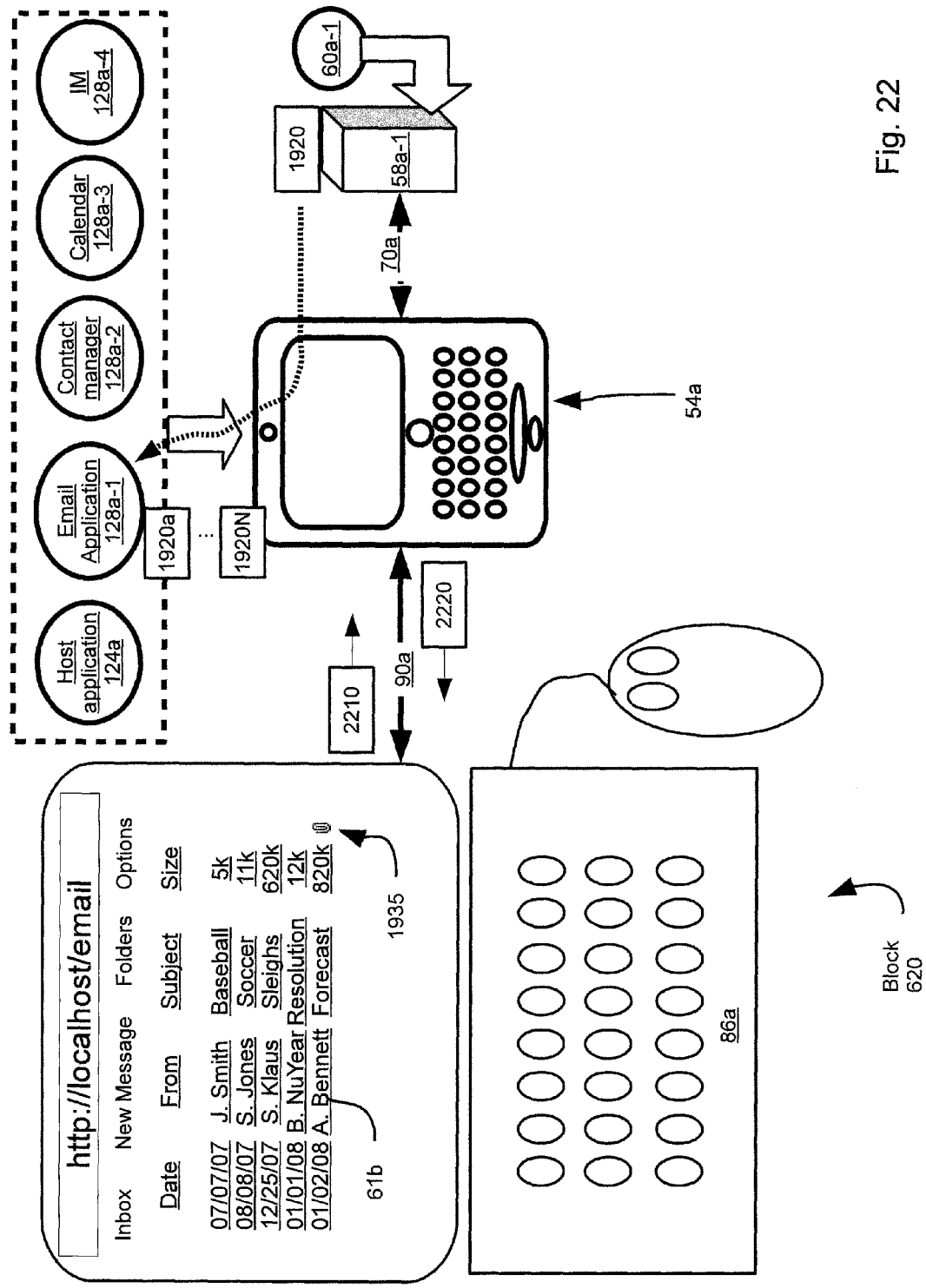
FIG. 22 shows the client machine and device of FIG. 12 to illustrate example performance of certain blocks of the method of FIG. 20.

At block 2005, attachment 1920 is received in a plurality of pieces, 1920*a* . . . 1090N, for example in packets transmitted from server 58*a*-1 to mobile computing device 54*a*, as depicted in FIG. 22. Pieces 1920*a* . . . 1920N are assembled into attachment 1920 by e-mail application 128*a*-1 or any other suitable element at mobile computing device 54*a*.

At blocks 2007, once request 1910 is transmitted at block 2001, computing machine 86*a* requests updates relating to downloading of attachment 1920 via requests 2210. It is appreciated that requests 2210 can be asynchronous requests as per method 700 described above. It is appreciated that blocks 2007-2015 of method 2000, described hereafter, are implemented in parallel with blocks 2003 to 2005. Hence, once download of attachment 1920 commences, mobile computing device 54*a* monitors download of attachment 1920 such that responses to requests 2210 can be generated in order to provide computing machine 86*a* with updates on the progress of the download of attachment 1920. For example, at block 2011, in response to receiving a request 2210 at block 2009, an update 2220 comprising progress data on the downloading of attachment 2220 is transmitted to computing machine 86*a*. It is further appreciated that requests 2210 can be received at mobile computing device 54*a* via host application 124*a*.

At block 2013, updates 2220 are received via link 90*a*. As will be described below with reference to FIGS. 24 and 25, browser 88*a* can be updated to provide an indication of the progress of the download of attachment 1920 at mobile computing device 54*a* based on updates 2220.

In any event, at block 2015, computing machine 86*a* determines whether download of attachment 1920 is complete. If not, anther request 2210 for an update is transmitted at block 2007. Further, as described above with reference to method 700, requests 2210 can be generated at any suitable interval.

However, when it is determined at computing machine 86*a* that download of attachment 1920 is complete, at block 2017 browser 88*a* provides an indicator that the download is complete with an option to begin transfer of attachment 1920 from mobile computing device 54*a* to computing machine 86*a*, as will be described below with reference to FIGS. 24 and 25.

Figure 23:
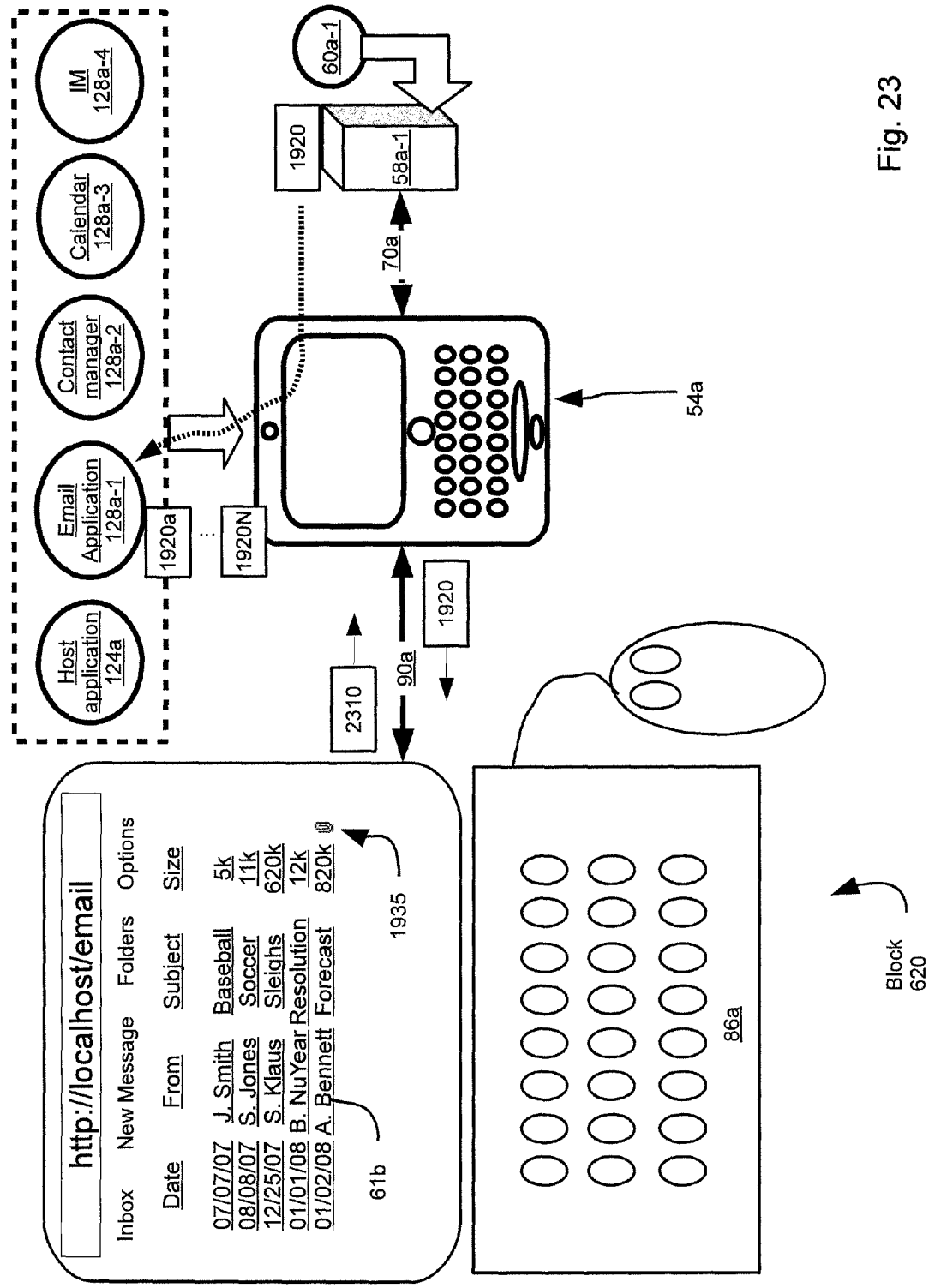
FIG. 23 shows the client machine and device of FIG. 12 to illustrate example performance of certain blocks of the method of FIG. 20.

Presuming that the option to begin transfer of attachment 1920 from mobile computing device 54*a* to computing machine 86*a* is actuated and/or selected at computing machine 86*a*, at block 2019 a request 2310 (as depicted in FIG. 23) is transmitted to mobile computing device 54*a*. At block 2021, mobile computing device 54*a* receives request 2310 and at block 2023 transmits attachment 1920 to computing machine 86*a* via link 90*a*. Attachment 1920 can then be viewed at computing machine 86*a*, for example using browser 88*a* or any other suitable application at computing machine 86*a*.

Figure 24:
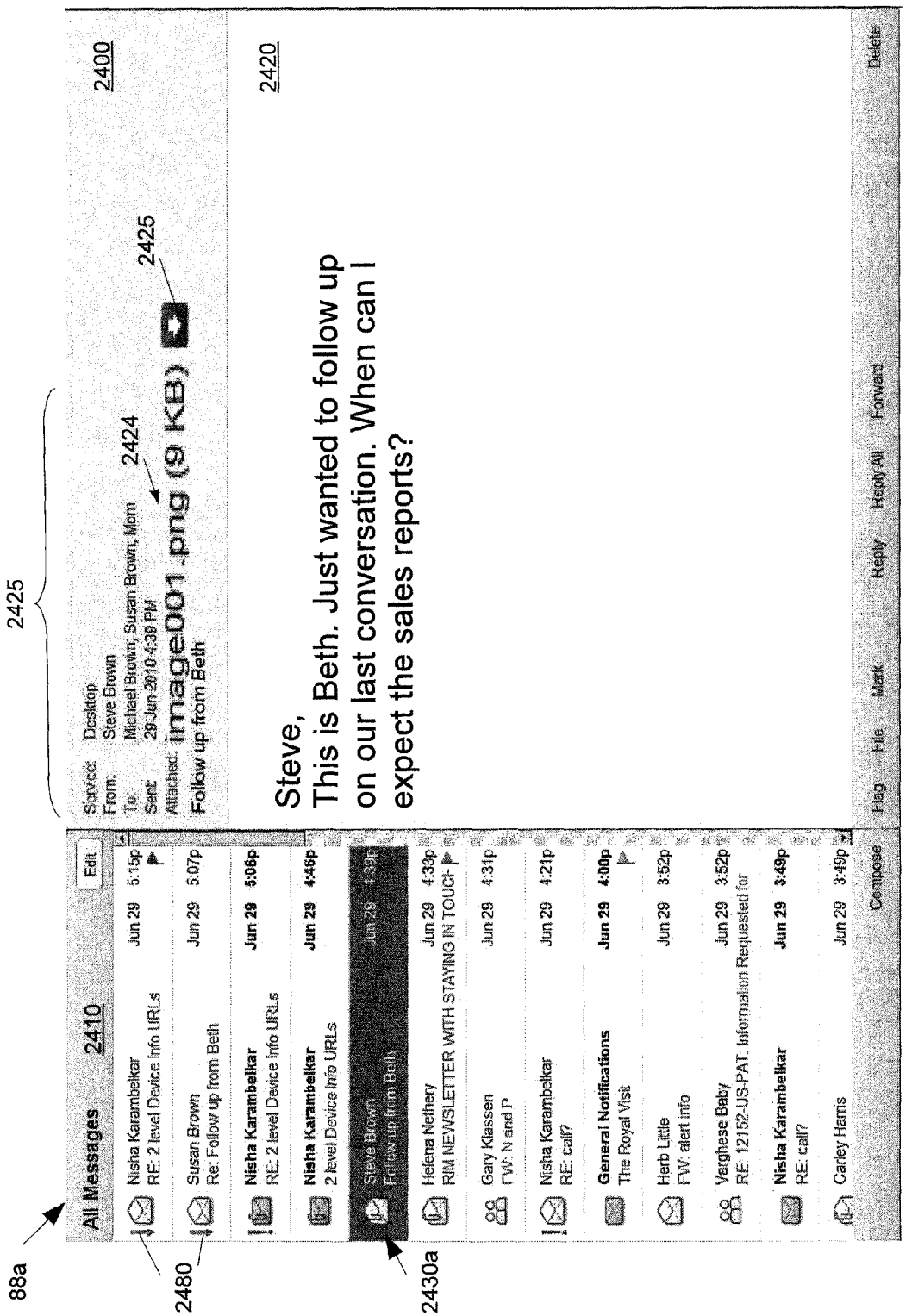
FIG. 24 shows an example Graphic User Interface for implementing certain blocks of the method of FIG. 20.
Figure 25:
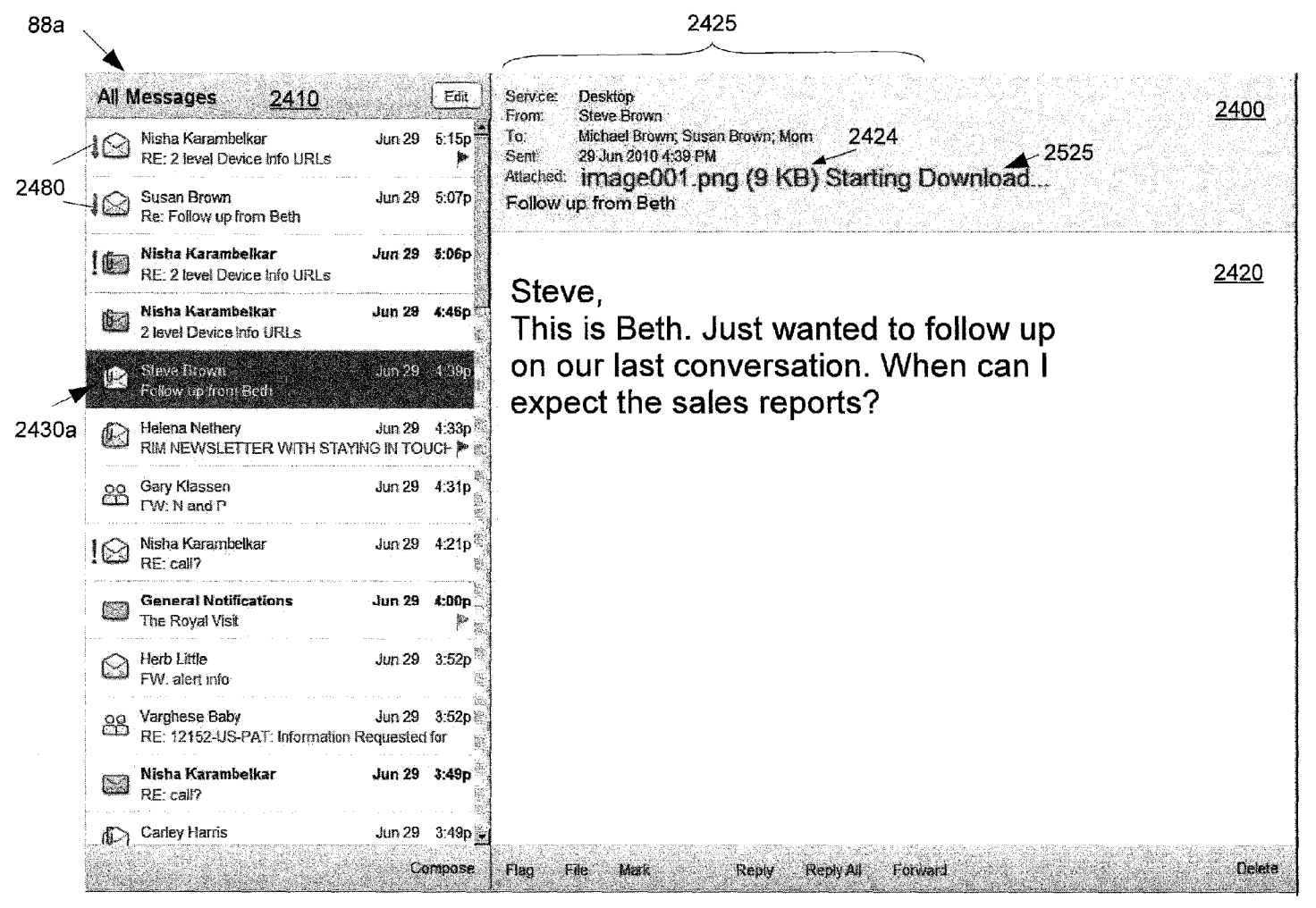

Attention is now directed to FIGS. 24 and 25, which depict non-limiting implementations of a Graphic User Interface (GUI) 2400 provided at browser 88*a*. A list 2410 of e-mails received is provided, each of which can be highlighted: for example, an e-mail 2430*a* from "Steve Brown", the subject of which is "Follow up from Beth" is highlighted in depicted implementations. In some implementations (e.g. as in FIG. 25 described below), associated text can be displayed in a panel 2420. Furthermore, meta-data associated with a highlighted e-mail can be provided in area 2425.

In particular, it is appreciated from indicator 2424 in area 2425 of FIG. 24 that e-mail 2430*a* is associated with an attachment "image001.png", of a size "9 KB". An icon 2450 is also provided adjacent indicator 2424 for initiating download of the associated attachment: for example, icon 2450 can be selected via an input device at computing machine 86*a* to initiate the download. However, it is appreciated that download of the attachment can be initiated in any suitable manner. For example, in alternative implementations, indicator 2424 can be selected via an input device at computing machine 86*a* and the download initiated using a double click.

Figure 26:
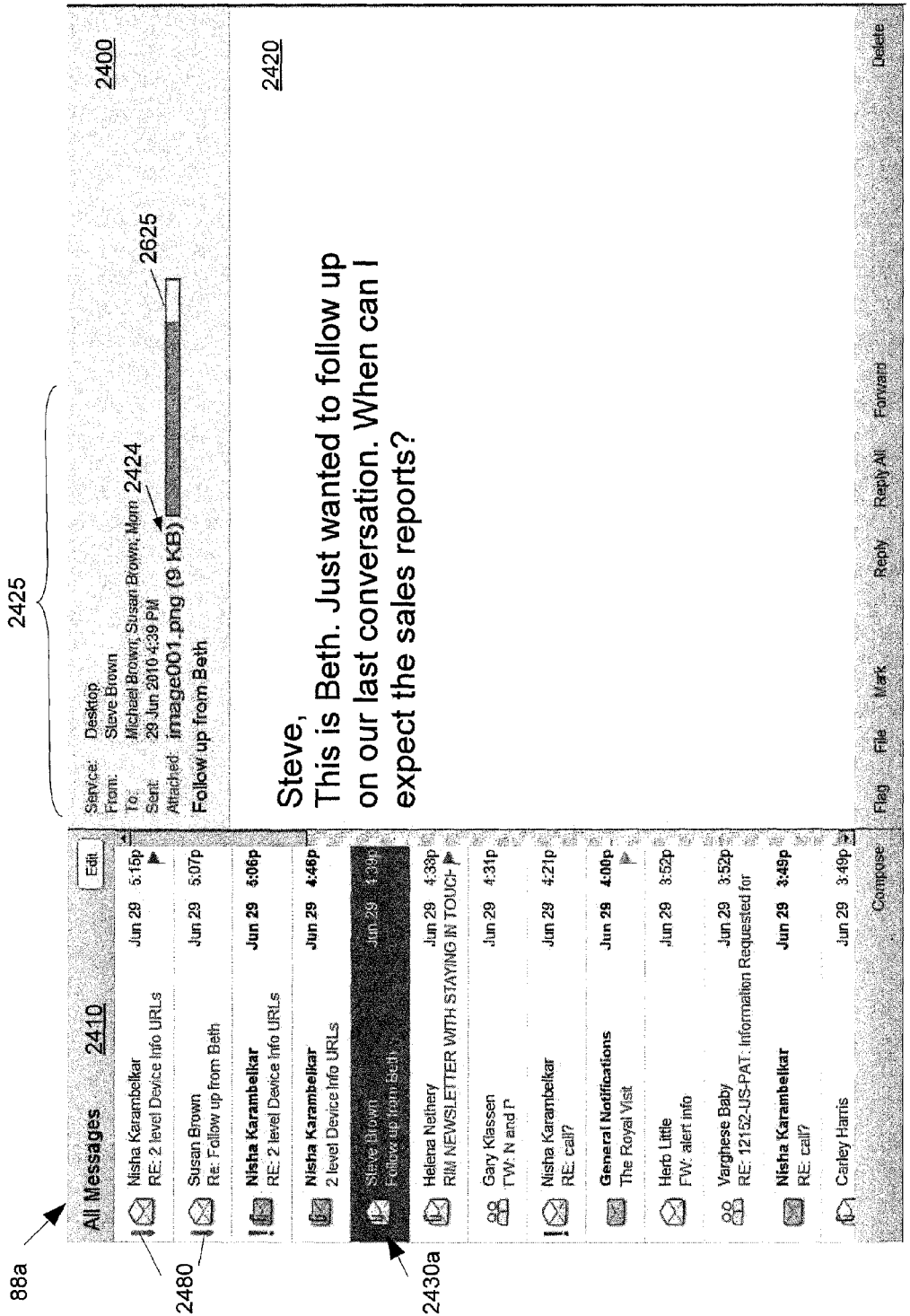
FIG. 26 shows an example Graphic User Interface for implementing certain blocks of the method of FIG. 20.

In any event, when download of the attachment is initiated, method 2000 is initiated and request 2110 is transmitted to mobile computing device 54*a*, as described above. Requests 2210 are then transmitted from computing device 86*a* to mobile computing device 54*a* and updates 2220 are received. Initiation of the download of the associated attachment can be indicated in GUI 2400 via text "Starting Download . . . " as depicted in FIG. 25. Progress of the download of the attachment at mobile computing device 54*a* can be indicated in progress bar 2625 adjacent indicator 2424, as depicted in FIG. 26. In some implementations, progress of the download can be indicated using any suitable indicator such as percentage downloaded, amount of data downloaded or the like. Indeed, any suitable indication of progress is contemplated.

Once the download is complete (i.e. block 2015 progresses to block 2017 in method 700), an indicator 2725 is provided indicating that the associated attachment has been downloaded to mobile computing device 54*a* and is available for transfer to computing machine 86*a*. In depicted implementations, indicator 2727 comprises a line drawn under indicator 2424. Further, in some implementations, indicator 2424 can change colour and/or change to a different font and/or a combination, or the like. In any event, indicator 2725 indicates that indicator 2424 can be selected to initiate transfer of the associated attachment to computing device 86*a* (i.e. blocks 2019 to 2025 of method 700 are executed) such that the associated attachment can be viewed and/or stored at computing machine 86*a*. In other words, indicator 2424 can appear as a clickable "link" (e.g. as in an HTML document) providing access to the associated attachment.

In some implementations, once transfer of the associated attachment to computing machine 86*a* has been initiated, a further indicator (not depicted) can be provided that indicates that the associated attachment is being transferred over link 90*a*; such a further indicator can include a warning not to sever link 90*a* until the transfer is complete, as well as an indication of when the transfer is complete.

Hence, a two phase download of an attachment to an e-mail is provided. In a first phase, the attachment is downloaded to mobile computing device 54*a*, the download being initiated at computing machine 86*a*. Progress of the download can be provided to computing machine 86*a* upon request. In a second phase, once the download is complete, the downloaded attachment can be transferred to computing machine 86*a*, for example upon request from computing machine 86*a*, however in other implementations transfer of the downloaded attachment can occur automatically once the download is complete. Furthermore, a copy of the downloaded attachment can be stored at mobile computing device 54*a* and accessed, for example, via e-mail application 128*a*-1. Hence, the downloaded attachment and the associated e-mail, can be viewed at both computing machine 86*a* and mobile computing device 54*a*.

Attention is now directed to optional icon 2480 in FIGS. 24-27 provided in list 2410 adjacent to given e-mails. Optional icon 2480 can be provided to indicate that the given e-mails have not yet been downloaded to computing machine 86*a*.

Figure 28:
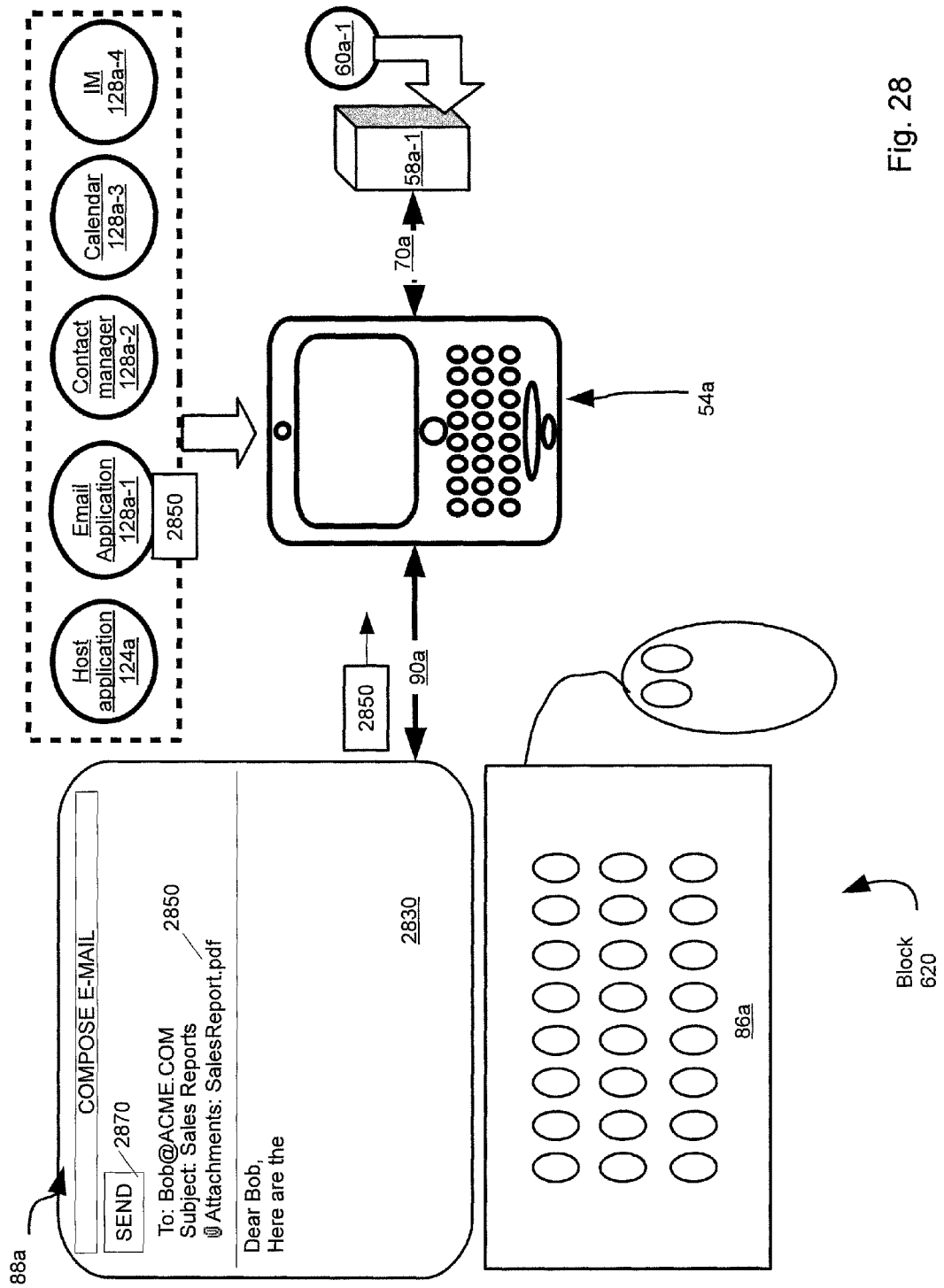
FIG. 28 shows the client machine and device of FIG. 12 to illustrate example performance of sending an attachment from the computing machine.
Figure 29:
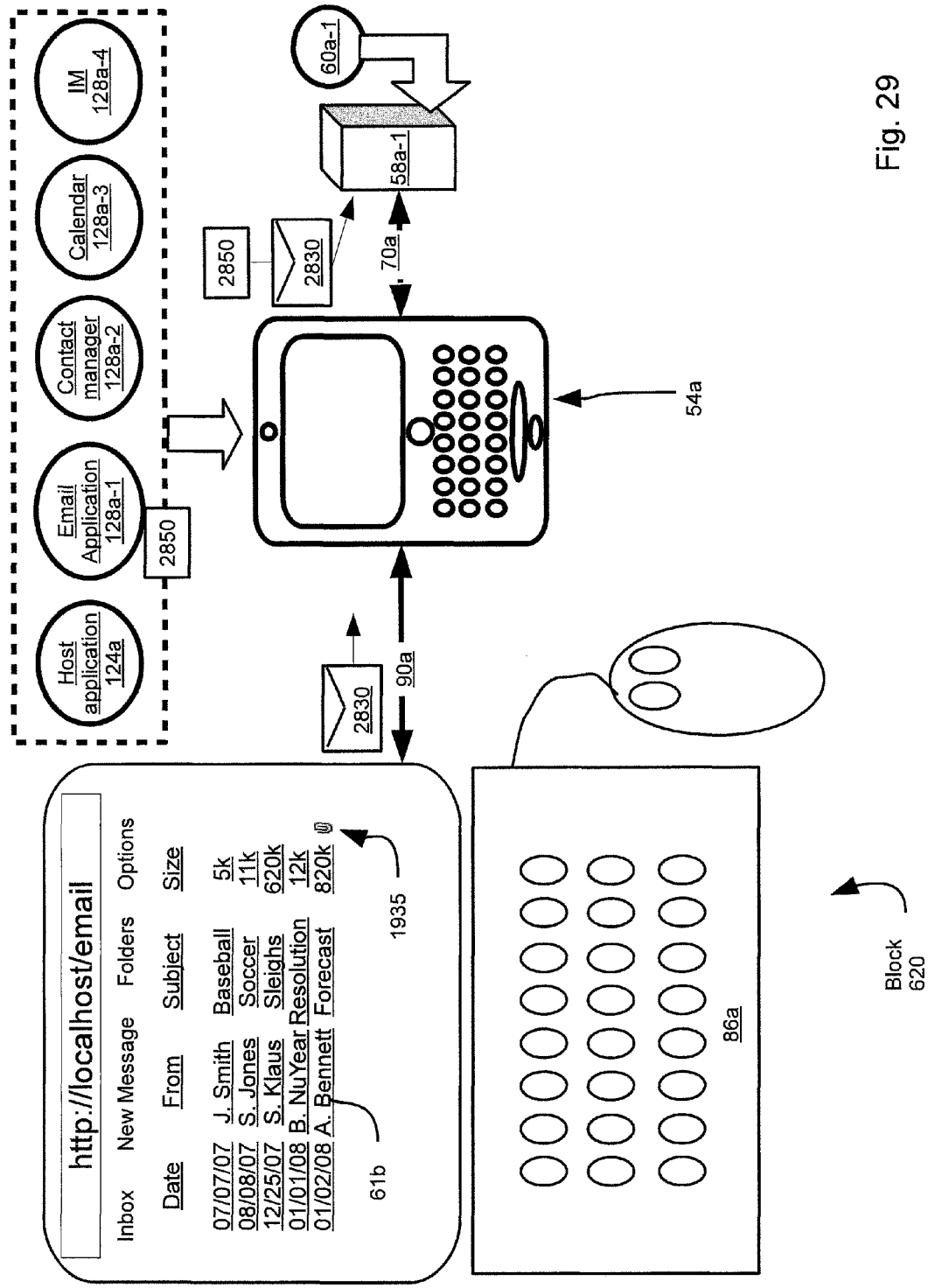
FIG. 29 shows the client machine and device of FIG. 12 to illustrate example performance of sending an attachment from the computing machine.

Attention is now directed to FIGS. 28 and 29, which are substantially similar to FIG. 23 with like elements having like numbers, however in these implementations, browser 88*a* is being used to compose an e-mail 2830 for transmittal to a destination computing device. Hence, in FIG. 28 an outgoing e-mail 2830 is being initiated at computing machine 86*a*. Further, before e-mail 2830 is sent, a document, or the like, can be attached to e-mail 2830 as attachment 2850, while e-mail 2850 is being composed: for example, the document titled "SalesReports.pdf". Once attachment 2850 is associate with e-mail 2830, computing machine 86*a* initiates transfer of attachment 2850 to mobile computing device 86*a* via link 90*a* while e-mail 2830 continues to be composed. Attachment 2850 is generally appreciated to be transferred in a plurality of pieces, hence, it takes a period of time to complete the transfer of attachment 2850 to mobile computing device 54*a*. It is appreciated that in FIG. 28, browser 88*a* further comprises a virtual send button 2870 for initiating sending of e-mail 2830.

Once composition of e-mail 2830 is complete, as in FIG. 29, and assuming transfer of attachment 2830 to mobile computing device 54*a* is complete, then e-mail 2830 can be sent to mobile computing device 54*a* via link 90*a*, for example upon actuation of send button 2870. Mobile computing device 54*a* then transmits both the e-mail and the associated attachment to server 58*a*-1 via link 70*a* for forwarding to a final destination (e.g. a destination computing device). A copy of attachment 2850 and e-mail 2830 is then hence available at both computing machine 86*a* and mobile computing device 54*a*.

However, if the transfer of attachment 2850 to mobile computing device 54*a* is not complete when composition of e-mail 2830 is complete, then sending of e-mail 2830 is delayed until the transfer of attachment 2850 is complete. Such a situation can occur when a time period for transferring attachment 2850 to mobile computing device 54*a* is larger than a time period used for completing e-mail 2830. In these implementations, it is desirable not to send e-mail 2830 until transfer/upload of attachment 2850 is complete. It is further desirable not to sever link 90*a* until transfer/upload of attachment 2850 is complete and/or e-mail 2830 is transmitted. To address this, in some implementations, send button 2870 can be disabled until attachment 2850 is uploaded to mobile computing device 54*a*, effectively delaying sending of e-mail 2830 until the upload of attachment 2850 is complete.

Figure 30:
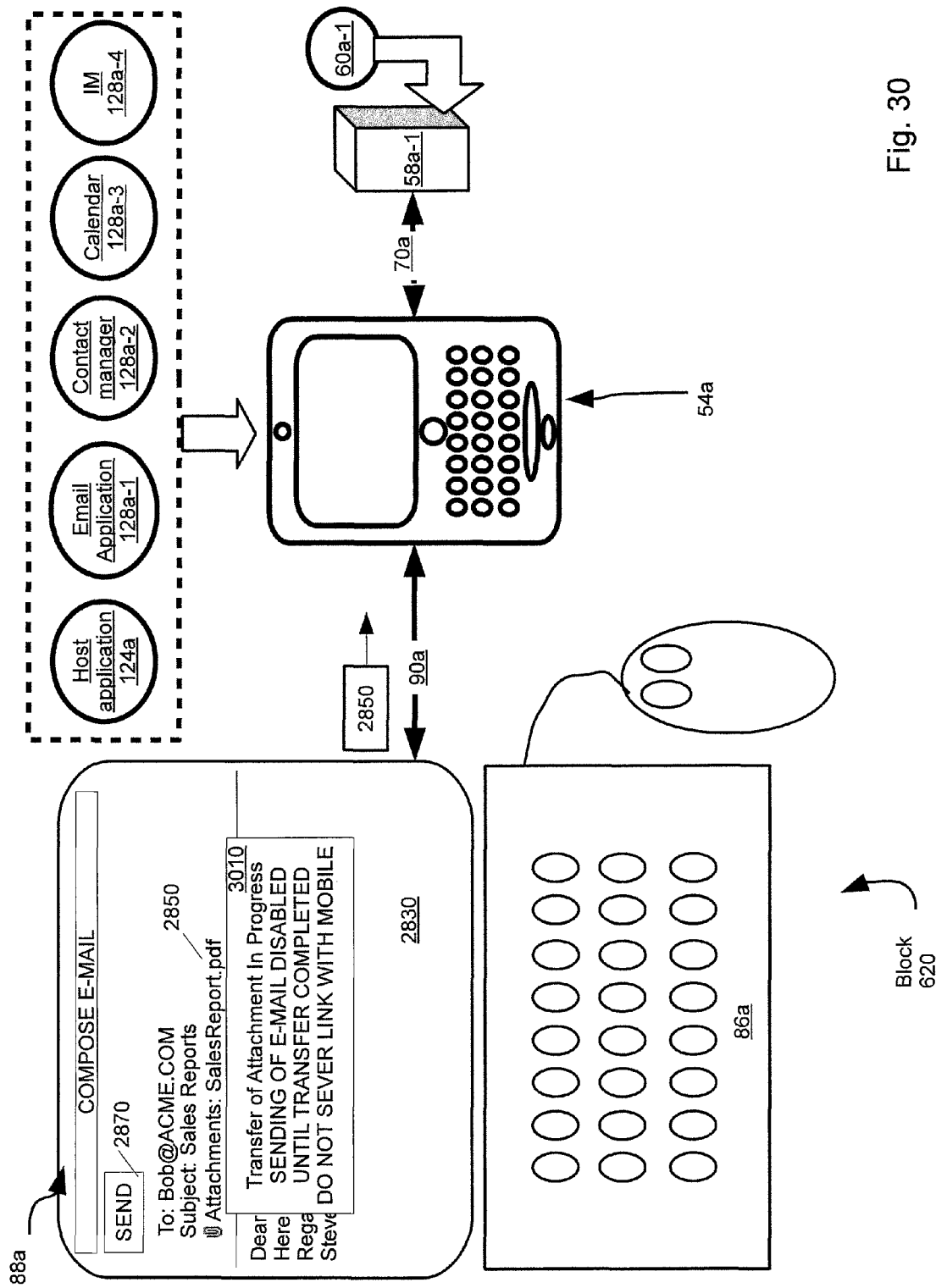
FIG. 30 shows the client machine and device of FIG. 12 to illustrate example performance of sending an attachment from the computing machine.
Figure 31:
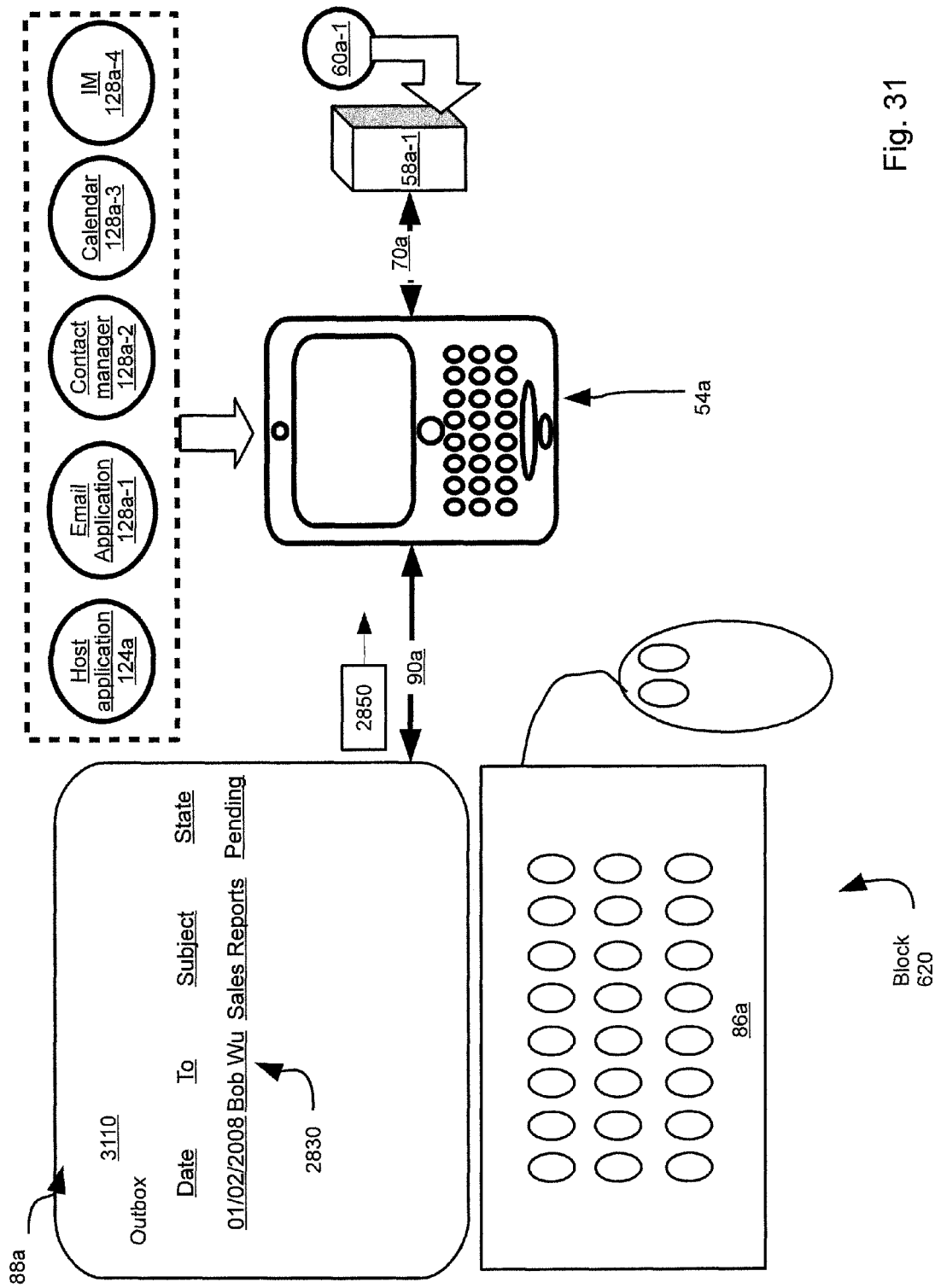
FIG. 31 shows the client machine and device of FIG. 12 to illustrate example performance of sending an attachment from the computing machine.

Alternatively, a dialog box 3010 can be provided, as in FIG. 30 (substantially similar to FIG. 28 with like elements having like numbers) indicating that e-mail 2830 can't be sent until the upload is finished. Alternatively, as in FIG. 31 (substantially similar to FIG. 28 with like elements having like numbers) an outbox 3110 can be provided once send button 2870 is actuated showing e-mail 2830 is in a pending state until upload of attachment 2850 is finished.

Various advantages will now be apparent. For example, mobile computing device 54*a* acts as an intermediary for upload and download of attachments to computing machine 86*a*. Hence, copies of e-mails and attachments are stored at both computing machine 86*a* and mobile computing device 54*a*, obviating a need for a later synchronization process. Furthermore, as mobile computing device 54*a* is generally understood to be enabled to connect to a wide variety of mail servers, by virtue of mobile computing device 54*a* act as an intermediary between computing machine 86*a* and server 58*a*-1, as well as other e-mail servers, for receiving and sending of attachments and e-mails, a need to configure computing machine 86*a* with similar functionality is obviated. Hence, the system of computing machine 86*a* is simplified, memory at computing machine 86*a* is conserved for storage of other data and processing resources at computing machine 86*a* are conserved.

Other variations, combinations, and subsets will now occur to those skilled in the art.

The invention claimed is:

1. A method for controlling transmission of an attachment to an e-mail using a plurality of computers comprising:

establishing a direct connection between a computing machine and a mobile computing device; the mobile computing device configured to execute a manager application regardless of whether the direct connection is active; the mobile computing device further configured to host an e-mail application that is accessible by the manager application; the mobile computing device further configured to execute a host application for accessing the manager application;

the host application comprising a web service application; the mobile computing device further connectable to an e-mail server for executing a server e-mail application that manages e-mail events for the e-mail application;

receiving a request at the web service application of the host application via the direct connection to download said attachment, said e-mail previously received at said e-mail application with an indication of said attachment, said request received from a browser executing on the computing machine, said browser providing an indication of said e-mail and said indication of said attachment, said browser accessing the web service application by accessing an address hosted by said host application;

requesting said attachment from at least one of said e-mail server and an attachment server in response to said receiving said request; and when said attachment is received at said mobile computing device, transmitting said attachment to said browser.

2. The method of claim 1, wherein said attachment is received in a plurality of pieces, and said transmitting said attachment to said browser occurs when all of said plurality of pieces are received.

3. The method of claim 2, further comprising, receiving at the host application a plurality of asynchronous requests relating to downloading of said attachment, from said computing machine, and transmitting to said browser respective progress data in response to at least a portion of said asynchronous requests.

4. The method of claim 1, further comprising, after receiving said attachment:
receiving at least one asynchronous request relating to downloading of said attachment from said computing machine;
transmitting to said computing machine an indication that said attachment has been downloaded;
in response to said transmitting, receiving a request from said computing machine to transmit said attachment to said browser such that said transmitting said attachment to said browser occurs in response to receiving said request.

5. The method of claim 1, further comprising:
receiving at said host application an uploading attachment from said computing machine;
receiving at said host application an uploading e-mail associated with said uploading attachment; and
when both of said uploading attachment and said uploading e-mail are received, transmitting said uploading attachment and said uploading e-mail to said e-mail server for forwarding onto a destination device.

6. The method of claim 5, wherein said uploading attachment is received in a plurality of pieces and said transmitting said uploading attachment and said uploading e-mail does not occur until all of said plurality of pieces are received.

7. The method of claim 5, wherein a copy of said uploading attachment and said uploading e-mail are stored at said mobile computing device, accessible by said e-mail application.

8. A method for controlling of transmission of an attachment to an e-mail using a plurality of computers comprising:
establishing a direct connection between a computing machine and a mobile computing device; the mobile computing device configured to execute a manager application regardless of whether the direct connection is active; the mobile computing device further configured to host an e-mail application that is accessible by the manager application; the mobile computing device further configured to execute a host application for accessing the manager application;
the host application comprising a web service application; the mobile computing device further connectable to an e-mail server for executing a server e-mail application that manages e-mail events for the e-mail application;
transmitting a request from a browser at said computing machine to the web service of the host application via the direct connection to download said attachment, said e-mail previously received at said e-mail application with an indication of said attachment, said browser providing an indication of said e-mail and said indication of said attachment, said browser accessing the web service application by accessing an address hosted by said host application, said request for triggering said host application to request said attachment from at least one of said e-mail server and an attachment server; and
receiving an indication from said host application that said attachment has been downloaded at said mobile computing device;
requesting said attachment from said host application; and
receiving said attachment at said browser.

9. The method of claim 8, further comprising:
transmitting to said host application a plurality of asynchronous requests relatinc to downloading of said attachment, from said computing machine; and
receiving from said host application respective progress data in response to at least a portion of said asynchronous requests.

10. The method of claim 9, further comprising and providing said respective progress data in said browser.

11. The method of claim 8, wherein said receiving said indication occurs in response to transmitting at least one asynchronous request relating to downloading of said attachment to said host application.

12. The method of claim 8, further comprising, in response to receiving said indication, providing a further an indicator in said browser that said attachment is available for retrieval from said mobile computing device.

13. The method of claim 8, wherein said requesting said attachment from said host application occurs in response to actuation of at least one of a virtual button and an input device at said computing machine,
receiving in response to said at least one asynchronous request, an indication that said attachment has been downloaded;
in response to receiving said indication, transmitting a request in response to said transmitting, receiving a request from said computing machine to transmit said attachment to said browser such that said transmitting said attachment to said browser occurs in response to receiving said request.

* * * * *